(12) United States Patent
Weisz

(10) Patent No.: US 9,664,260 B2
(45) Date of Patent: May 30, 2017

(54) DIFFERENTIAL ENGINE CONTROLLED ROTATIONAL POWER TRANSMISSION APPARATUS AND SYSTEMS USING THE SAME

(71) Applicant: CVET Patent Technologies Inc., Markham (CA)

(72) Inventor: Ervin Weisz, Thornhill (CA)

(73) Assignee: CVET Patent Technologies Inc., Markham (CA)

( * ) Notice: Subject to any disclaimer, the term of this patent is extended or adjusted under 35 U.S.C. 154(b) by 92 days.

(21) Appl. No.: 14/837,389

(22) Filed: Aug. 27, 2015

(65) Prior Publication Data

US 2015/0362046 A1 Dec. 17, 2015

Related U.S. Application Data

(63) Continuation of application No. 14/212,223, filed on Mar. 14, 2014, now Pat. No. 9,121,480.

(60) Provisional application No. 61/789,440, filed on Mar. 15, 2013.

(51) Int. Cl.
| | |
|---|---|
| *F16H 3/72* | (2006.01) |
| *F16H 3/10* | (2006.01) |
| *F16H 47/08* | (2006.01) |
| *F16H 3/00* | (2006.01) |
| *F16H 47/10* | (2006.01) |

(52) U.S. Cl.
CPC .............. *F16H 3/72* (2013.01); *F16H 3/006* (2013.01); *F16H 3/10* (2013.01); *F16H 47/08* (2013.01); *F16H 47/10* (2013.01)

(58) Field of Classification Search
None
See application file for complete search history.

(56) References Cited

U.S. PATENT DOCUMENTS

| | | | |
|---|---|---|---|
| 2,968,197 | A | 1/1961 | De Lorean |
| 4,800,779 | A | 1/1989 | Parker |
| 6,461,266 | B1 | 10/2002 | Weisz |
| 6,569,048 | B1 | 5/2003 | Swales |
| 6,726,588 | B2 | 4/2004 | Weisz |
| 2002/0160873 | A1 | 10/2002 | Weisz |
| 2007/0087893 | A1 | 4/2007 | Tabata et al. |
| 2008/0194369 | A1 | 8/2008 | Boutou et al. |
| 2009/0011895 | A1 | 1/2009 | Tabata et al. |

(Continued)

FOREIGN PATENT DOCUMENTS

| | | |
|---|---|---|
| EP | 2522539 A1 | 11/2012 |
| FR | 2884766 A1 | 10/2006 |
| WO | 9002891 A1 | 3/1990 |

OTHER PUBLICATIONS

Supplementary European Search Report from EP 14764296 dated Aug. 4, 2016.

*Primary Examiner* — Ramya Burgess
*Assistant Examiner* — Timothy M Hannon
(74) *Attorney, Agent, or Firm* — Caesar Rivise, PC

(57) ABSTRACT

A rotational power transmission apparatus is provided including an input coupler having first and second input shafts, a differential engine coupled to the first input shaft and transmitting power to a first output shaft. First and second one-way bearings are coupled to the first output shaft. A first torque converter is coupled to the first one-way bearing, and a second torque converter coupled to the second one-way bearing. An output coupler is coupled to output from the first torque converter, output from the second torque converter and a second output shaft.

14 Claims, 20 Drawing Sheets

(56) References Cited

U.S. PATENT DOCUMENTS

2010/0155157 A1 6/2010 Grieve
2012/0149513 A1 6/2012 Robinette et al.

DIFFERENTIAL ENGINE CONTROLLED ROTATIONAL POWER TRANSMISSION APPARATUS AND SYSTEMS USING THE SAME

This application is a continuation of U.S. application Ser. No. 14/212,223, filed Mar. 14, 2014, which claims priority to U.S. Provisional Application 61/789,440, filed Mar. 15, 2013, both of which are incorporated by reference in their entireties.

FIELD

The field of the invention relates to rotational power transmission apparatus and systems using the same.

BACKGROUND

In some cases, a load (e.g. wheels of a vehicle) may require power at a rotary speed that is inefficient for the power source (e.g. an internal combustion engine). For example, some vehicle engines operate most efficiently in a narrow range of rotary speeds (e.g. RPM's).

A differential engine may be used to provide a variable speed conversion ratio between the output of a power source and the input to a load. This may permit the power source to operate at an efficient speed which is converted by the differential engine to provide the required input speed to the load.

According to some differential engine designs, a differential engine must be large to provide a large speed conversion ratio (whether positive or negative). For example, some differential engines include motor/generators for controlling the speed conversion ratio provided by the differential engine. In this case, a large speed conversion ratio may require more powerful (and typically larger) motor/generators.

It may be desirable for a system to provide a wide range of speed conversion ratios using a small differential engine.

SUMMARY

In a first aspect, there is provided a rotational power transmission apparatus. The rotational power transmission apparatus comprises a first input shaft, a differential engine coupled to the first input shaft, a first one-way bearing, a first torque converter, a second one-way bearing, a second torque converter, and a first output coupler. The differential engine may apply a variable speed conversion ratio between the first input shaft and a first output shaft. The differential engine may be controllable to set the variable speed conversion ratio to a speed conversion ratio within a range of speed conversion ratios, the range including negative and positive speed conversion ratios. The first one-way bearing may be coupled to the first output shaft. The first torque converter may be coupled to the first one-way bearing. The first one-way bearing may transmit power between the first output shaft and the first torque converter when the first one-way bearing is driven by the first output shaft rotating in a first direction or when the first output shaft is driven by the first one-way bearing to rotate in a second direction opposite the first direction. The second one-way bearing may be coupled to the first output shaft. The second torque converter may be coupled to the second one-way bearing. The second one-way bearing may transmit power between the first output shaft to the second torque converter when the first one-way bearing is driven by the first output shaft rotating in the second direction or when the first output shaft is driven by the first one-way bearing to rotate in the first direction. The first output coupler may be coupled to output from the first torque converter, output from the second torque converter and a second output shaft.

The rotational power transmission apparatus may further comprise an input coupler having the first input shaft and a second input shaft, a multiple-port differential having two input ports and a first output port, one of the input ports coupled to the second output shaft, and one of the input ports coupled to second input shaft; and a third output shaft coupled to the first output port of the multiple port differential.

One or both of the input coupler and the output coupler may be a differential or epicyclical gear. The multi-port differential may be one of a differential gear box and an epicyclical gear.

The multi-port differential may rotate the third output shaft at a speed which is the arithmetic sum of the speeds of the second output shaft and the second input shaft.

The multi-port differential may apply a torque conversation ratio other than 1:1 to one or more of the input ports and the first output port of the multi-port differential.

The rotational power transmission apparatus may further comprise a second output coupler coupled to output from the first torque converter, output from the second torque converter and a fourth output shaft, wherein the multi-port different includes a third input port coupled to the fourth output shaft.

The rotational power transmission apparatus may further comprise a first intermediary coupler coupling the output from the first torque converter to each of the first and second output couplers, and a second intermediary coupler coupling the output from the first torque converter to each of the first and second output couplers.

The first intermediary coupler may provide control over the transmission of power from the output from the first torque converter to one of the first and second output couplers, and the second intermediary coupler may provide control over the transmission of power from the output from the second torque converter to one of the first and second output couplers.

The first output coupler may have a different torque conversion ratio than the second output coupler.

One or more of the three input ports and the first output port of the multi-port differential may be one or more of selectively lockable and selectively disconnectable.

At least two ports of the multi-port differential may be kinematically related to each other.

The multi-port differential may apply a different torque conversion ratio to two or more of the input and output ports of the multi-port differential.

The rotational power transmission apparatus may further comprise a plurality of output couplers, including the first output coupler, wherein each of the plurality of output couplers is coupled to output from the first torque converter, output from the second torque converter and a different one of a plurality of output shafts which include the second output shaft, and wherein the multi-port different includes a plurality of input ports, including the two input ports, and each of the plurality of input ports is coupled to a different one of the plurality of output shafts.

The rotational power transmission apparatus may further comprise a plurality of intermediary couplers, wherein each of the plurality of intermediary couplers couples one of the output from the first torque converter, the output from the second torque converter, and the output from one of the plurality of intermediary couplers to one of one of the plurality of output couplers and one of the plurality of intermediary couplers.

Each of the plurality of intermediary couplers controls the transfer of power from the output from one of the first and second torque converter to one of the first and second output couplers.

The rotational power transmission apparatus may further comprise an input coupler coupling the first input shaft to the differential engine, and an output coupler coupling the third output shaft to the differential engine.

The input coupler may provide control over the transfer of power from the first input shaft to the differential engine, and the output coupler may provide control over the transfer of power from the third output shaft to the differential engine.

The multi-port differential may include a plurality of output ports, including the first output port.

The rotational power transmission apparatus may further comprise an input coupler coupled to the first input shaft and a second input shaft, a multiple-port differential having a plurality of input ports and a plurality of output ports, wherein one of the input ports coupled to the second output shaft, and a different one of the input ports coupled to second input shaft; a third output shaft coupled to one of the output ports of the multiple port differential; and a second output coupler coupling the third output shaft to the differential engine.

The input coupler may transmit power between an engine of a vehicle and the first and second input shafts, and the third output shaft may transmit power to one or more wheels of the vehicle.

In another aspect, there is provided a vehicle. The vehicle comprises a primary engine, and at least one power transmission apparatus. Each power transmission apparatus may comprise an input coupler, a differential engine, a first one-way bearing, a first torque converter, a second one-way bearing, a second torque converter, a first output coupler, a multiple-port differential, and a third output shaft. The input coupler may have a first input shaft and a second input shaft. The input coupler may transmit power between the primary engine and the first and second input shafts. The differential engine may apply a variable speed conversion ratio between the first input shaft and a first output shaft. The differential engine may be controllable to set the variable speed conversion ratio to a speed conversion ratio within a range of speed conversion ratios, the range including negative and positive speed conversion ratios. The first one-way bearing may be coupled to the first output shaft. The first torque converter may be coupled to the first one-way bearing. The first one-way bearing may transmit power between the first output shaft and the first torque converter when the first one-way bearing is driven by the first output shaft rotating in a first direction or when the first output shaft is driven by the first one-way bearing to rotate in a second direction opposite the first direction. The second one-way bearing may be coupled to the first output shaft. The second torque converter may be coupled to the second one-way bearing. The second one-way bearing may transmit power between the first output shaft and the second torque converter when the first one-way bearing is driven by the first output shaft rotating in the second direction or when the first output shaft is driven by the first one-way bearing to rotate in the first direction. The first output coupler may be coupled to output from the first torque converter, output from the second torque converter and a second output shaft. The multiple-port differential may have two input ports and a first output port. One of the input ports may be coupled to the second output shaft, and one of the input ports may be coupled to second input shaft. The third output shaft may be coupled to the first output port of the multiple port differential.

The vehicle may further comprise at least one wheel. Each of the at least one wheel may be coupled to the third output shaft of a different one of the at least one power transmission apparatus for transmitting power between the primary engine and the wheel.

In another aspect, there is provided a rotational power transmission apparatus. The apparatus may comprise first, second, and third input shafts, a coupler coupling the first, second, and third input shafts, and a differential engine coupled to the first shaft. The differential engine may apply a variable speed conversion ratio between the first input shaft and a first output shaft. The differential engine may be controllable to set the variable speed conversion ratio to a speed conversion ratio within a range of speed conversion ratios, the range including negative and positive speed conversion ratios. A multi-port differential may have a first input port coupled to the second input shaft, a second input port coupled to the first output shaft, and an output port. An output shaft may be coupled to the output port of the multi-port differential.

The apparatus may further comprise a torque converter coupled to the first output shaft and the first input port of the multi-port differential.

The apparatus may further comprise a plurality of output couplers, wherein each of the plurality of output couplers is coupled to the first output shaft, and a different one of a plurality of second output shafts, and wherein the multi-port different includes a plurality of input ports, including the second input port, and each of the plurality of input ports is coupled to a different one of the plurality of second output shafts.

In another aspect, there is a network of differential engine controlled apparatus. The network may comprise a plurality of differential engine controlled apparatus. Each differential engine controlled apparatus may comprise a first input shaft, a differential engine coupled to the first input shaft, a first one-way bearing, a first torque converter, a second one-way bearing, a second torque converter, and a first output coupler. The differential engine may include a controller for sending and receiving network signals. The differential engine may apply a variable speed conversion ratio between the first input shaft and a first output shaft. The differential engine may be controllable to set the variable speed conversion ratio to a speed conversion ratio within a range of speed conversion ratios, the range including negative and positive speed conversion ratios. The first one-way bearing may be coupled to the first output shaft. The first torque converter may be coupled to the first one-way bearing. The first one-way bearing may transmit power between the first output shaft and the first torque converter when the first one-way bearing is driven by the first output shaft rotating in a first direction or when the first output shaft is driven by the first one-way bearing to rotate in a second direction opposite the first direction. The second one-way bearing may be coupled to the first output shaft. The second torque converter may be coupled to the second one-way bearing. The second one-way bearing may transmit power between the first output shaft to the second torque converter when the first one-way bearing is driven by the first output shaft rotating in the second direction or when the first output shaft is driven by the first one-way bearing to rotate in the first direction. The first output coupler may be coupled to output from the first torque converter, output from the second torque converter and a second output shaft. The controller of the differential engine of each of the plurality of differential engine controlled apparatus may communicate with the controller of the differential engine of at least one other of the plurality of differential engine controlled apparatus by network signals.

DRAWINGS

Figure 7:
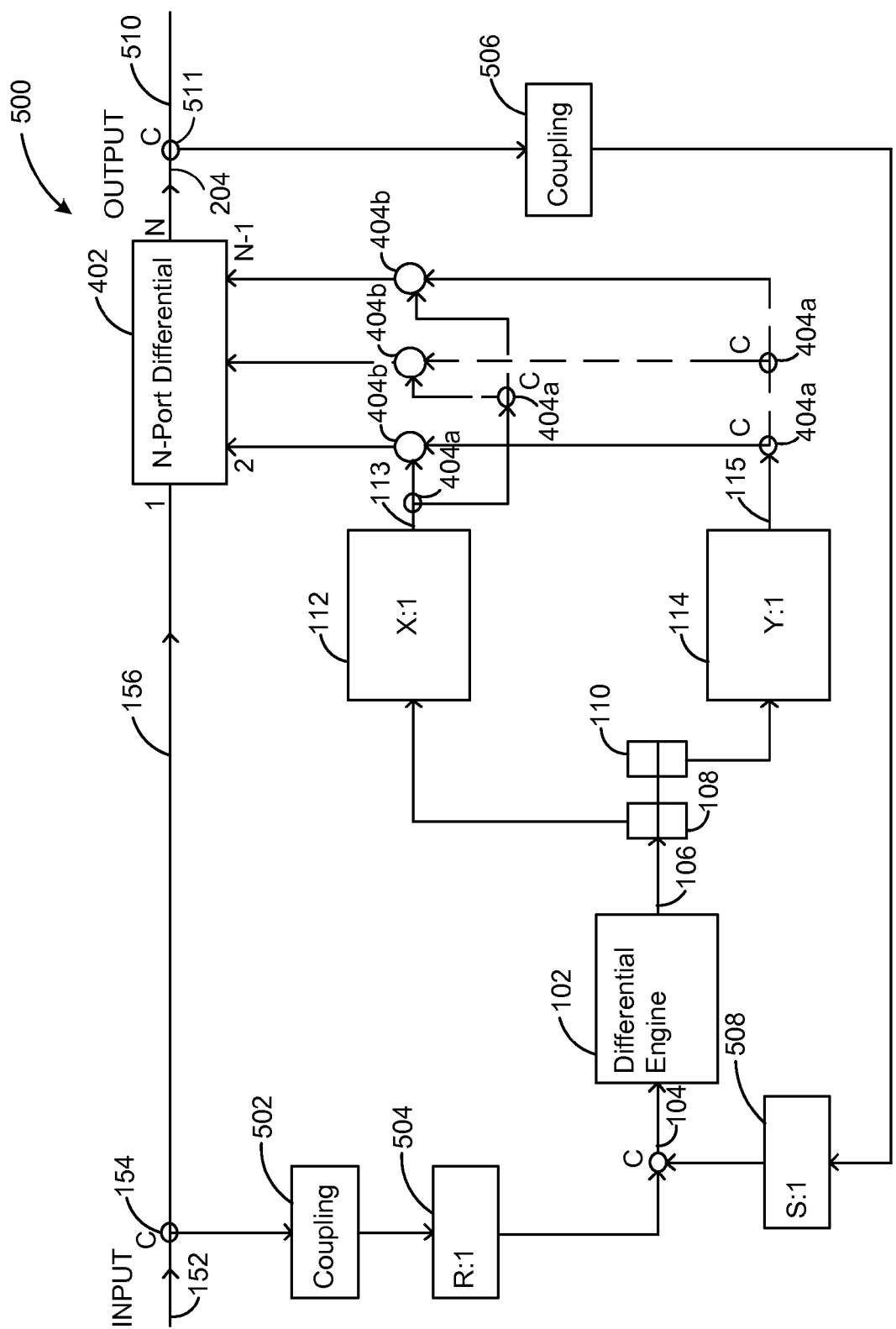
Figure 8:
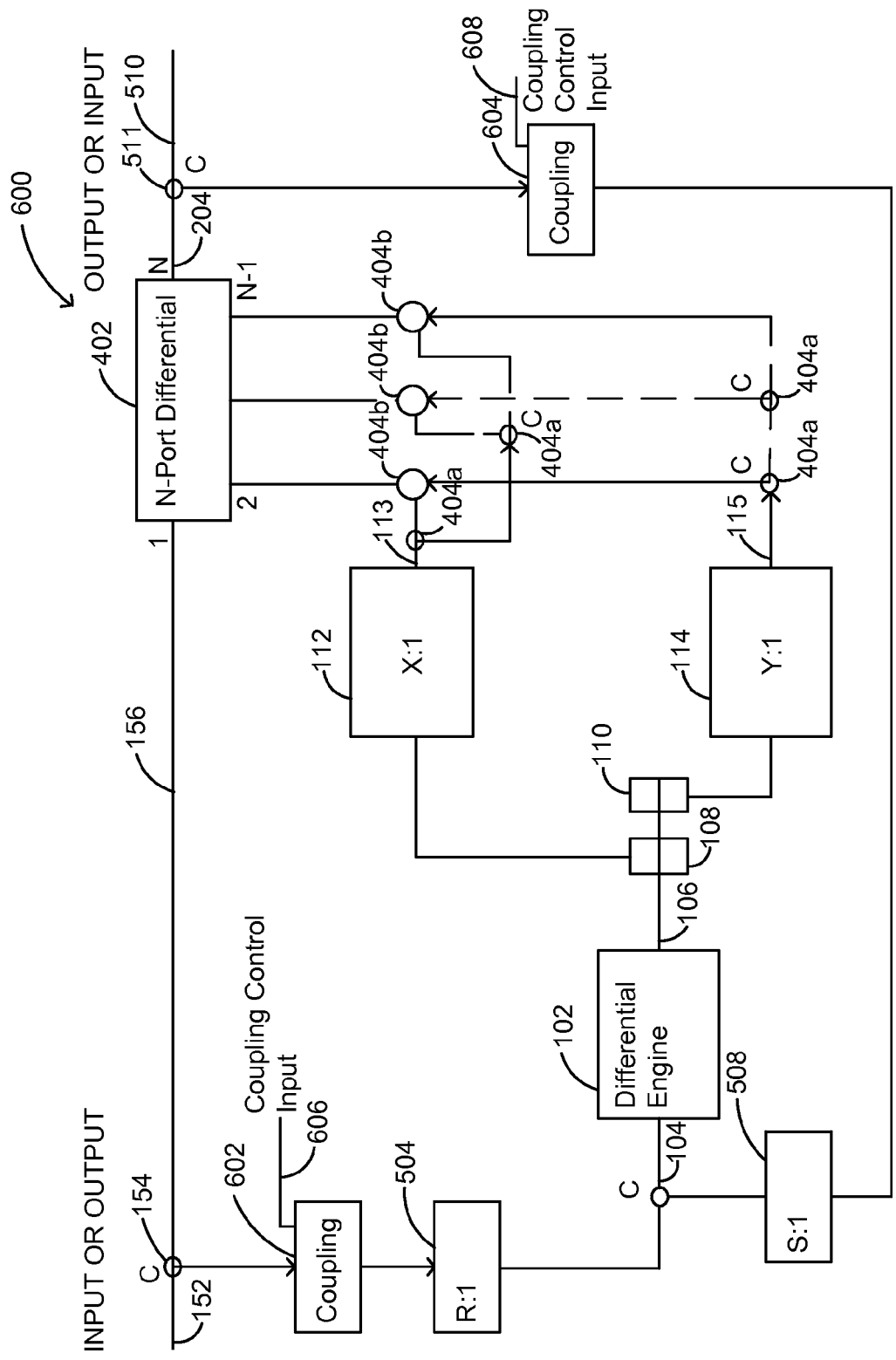
Figure 9:
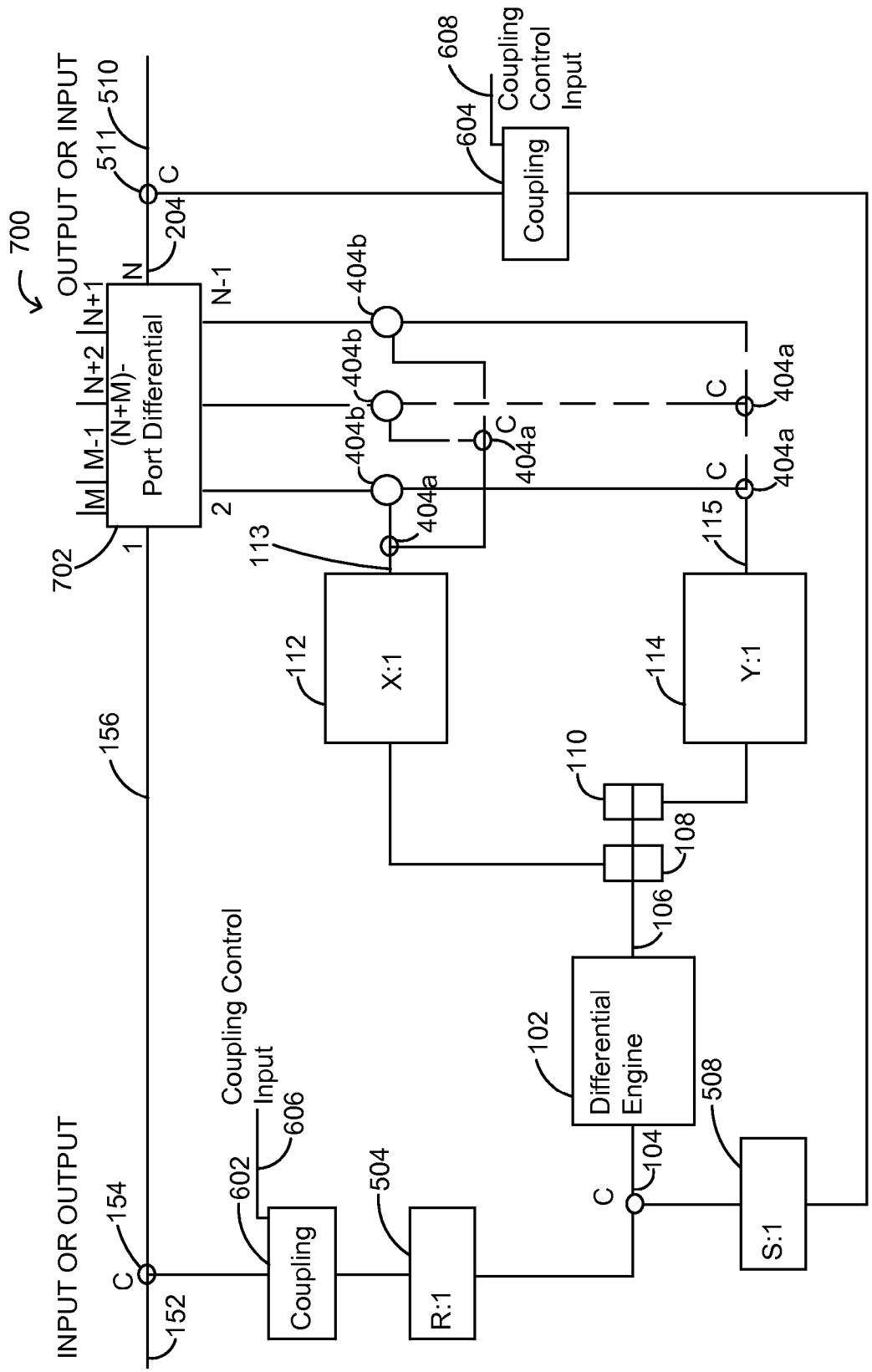
Figure 10:
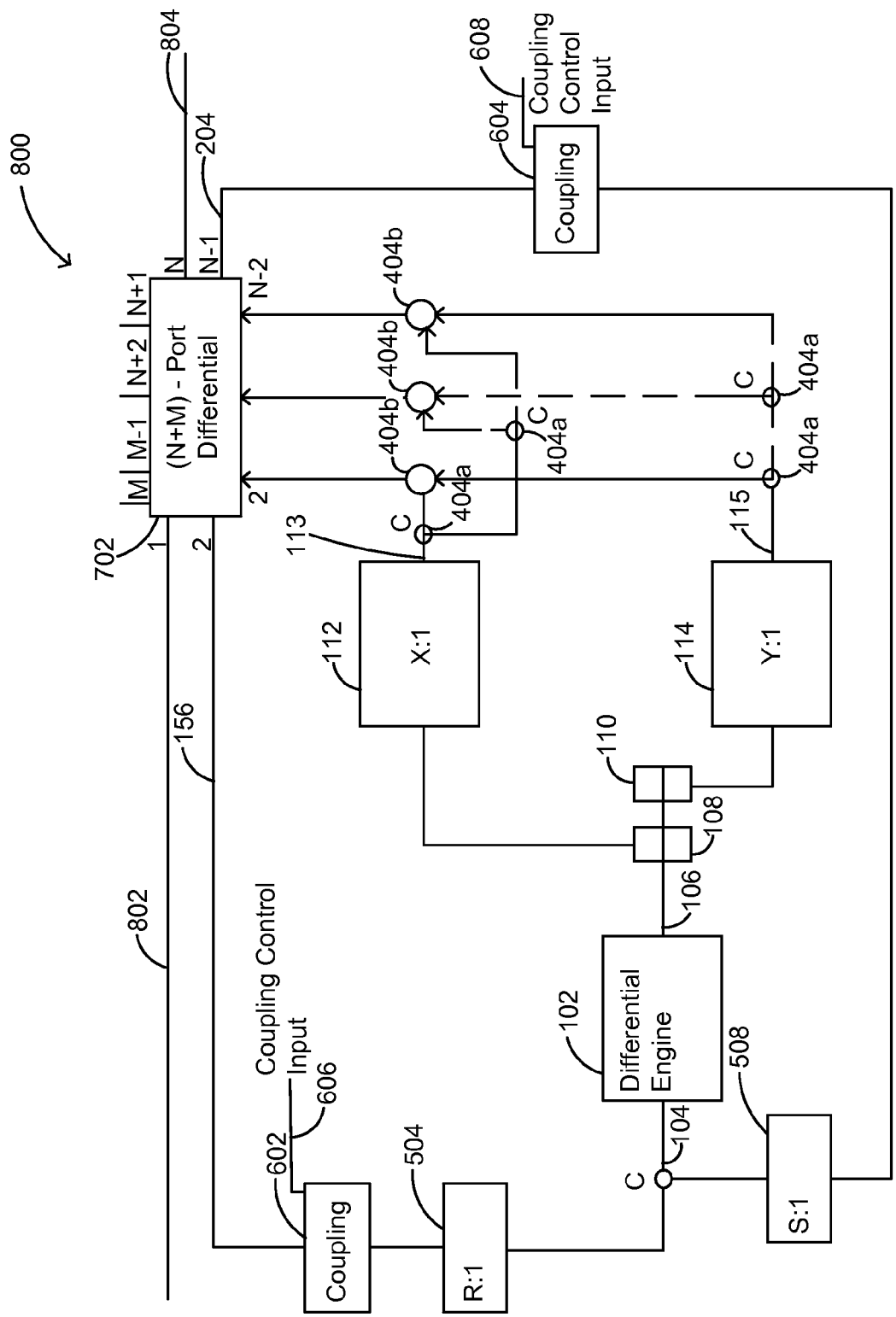
Figure 11:
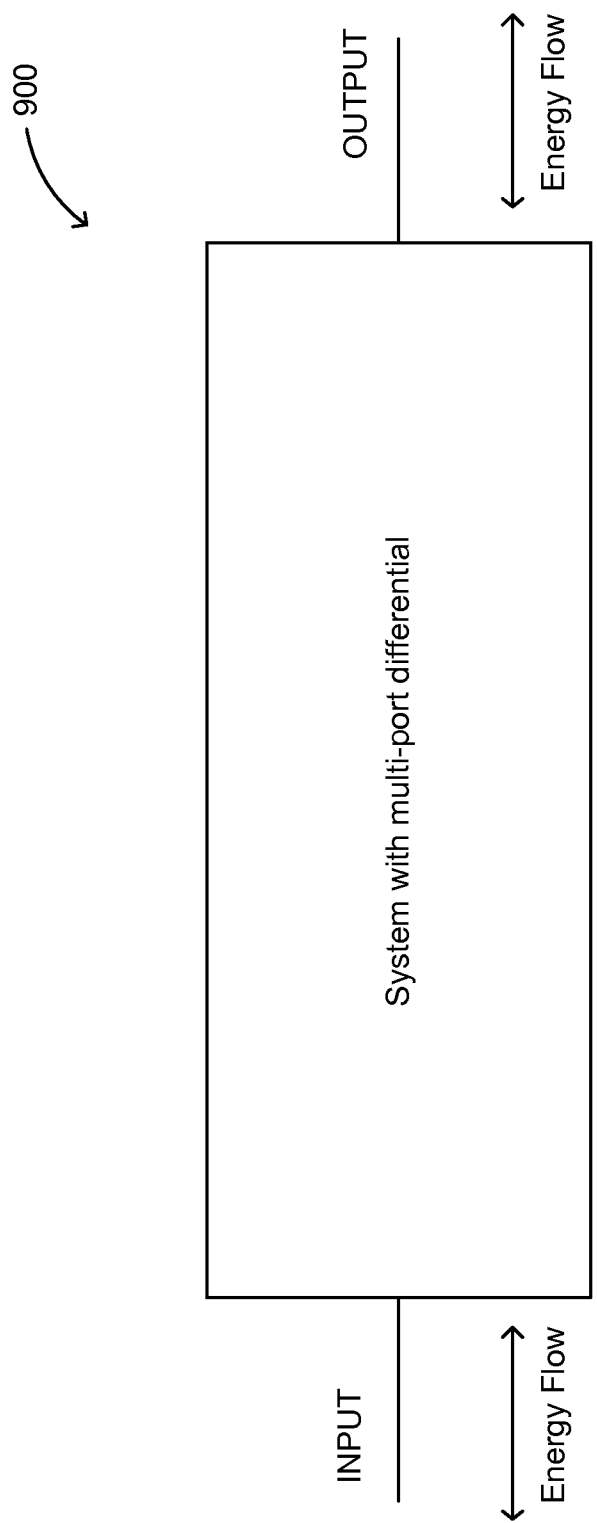
Figure 12:
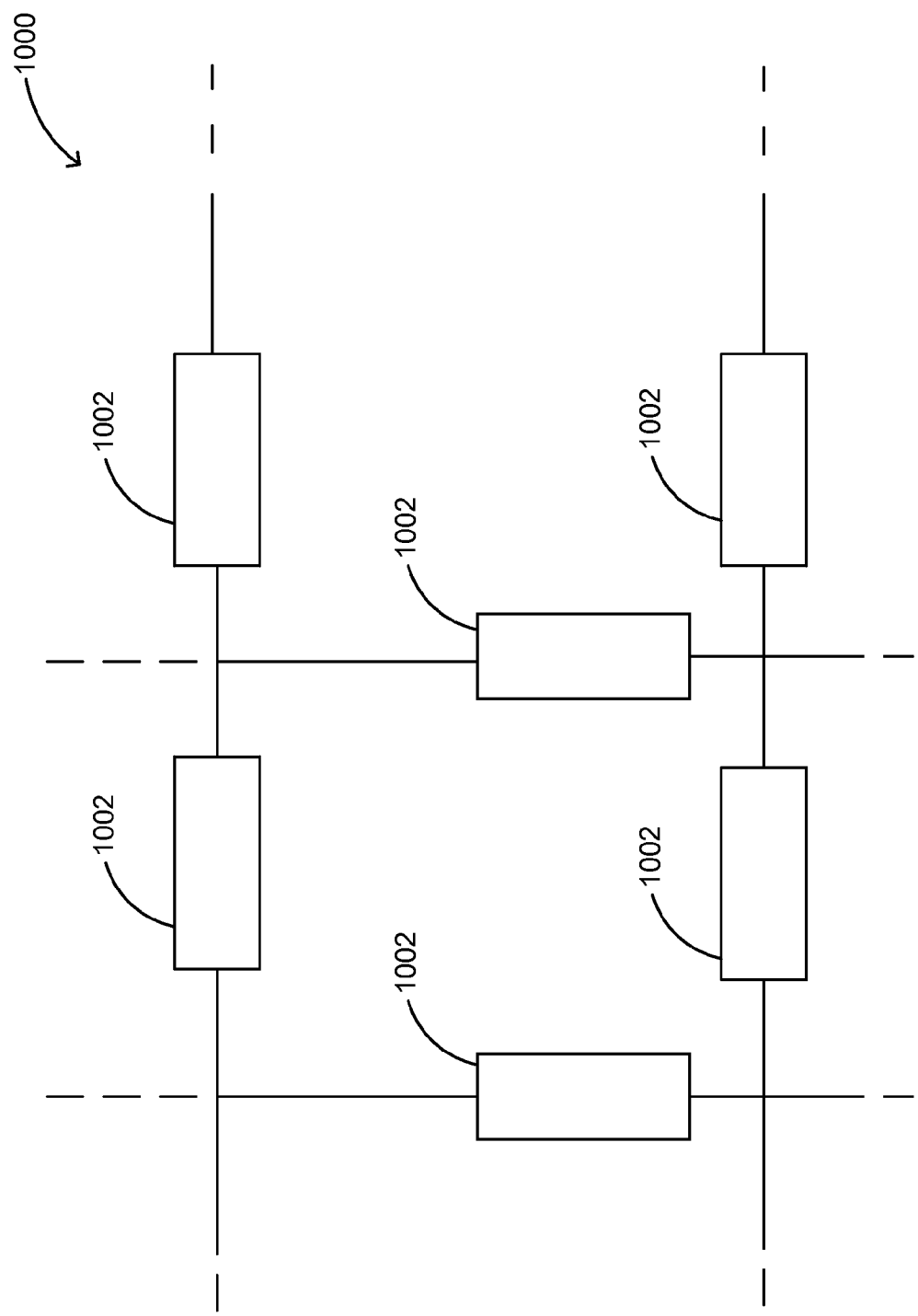
Figure 13:
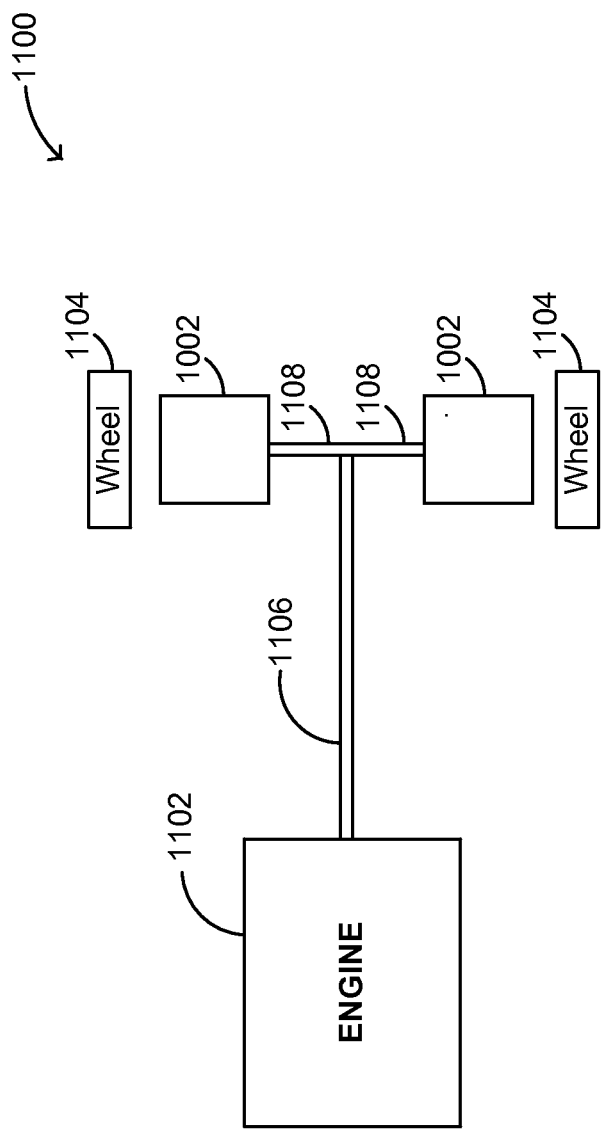
Figure 14:
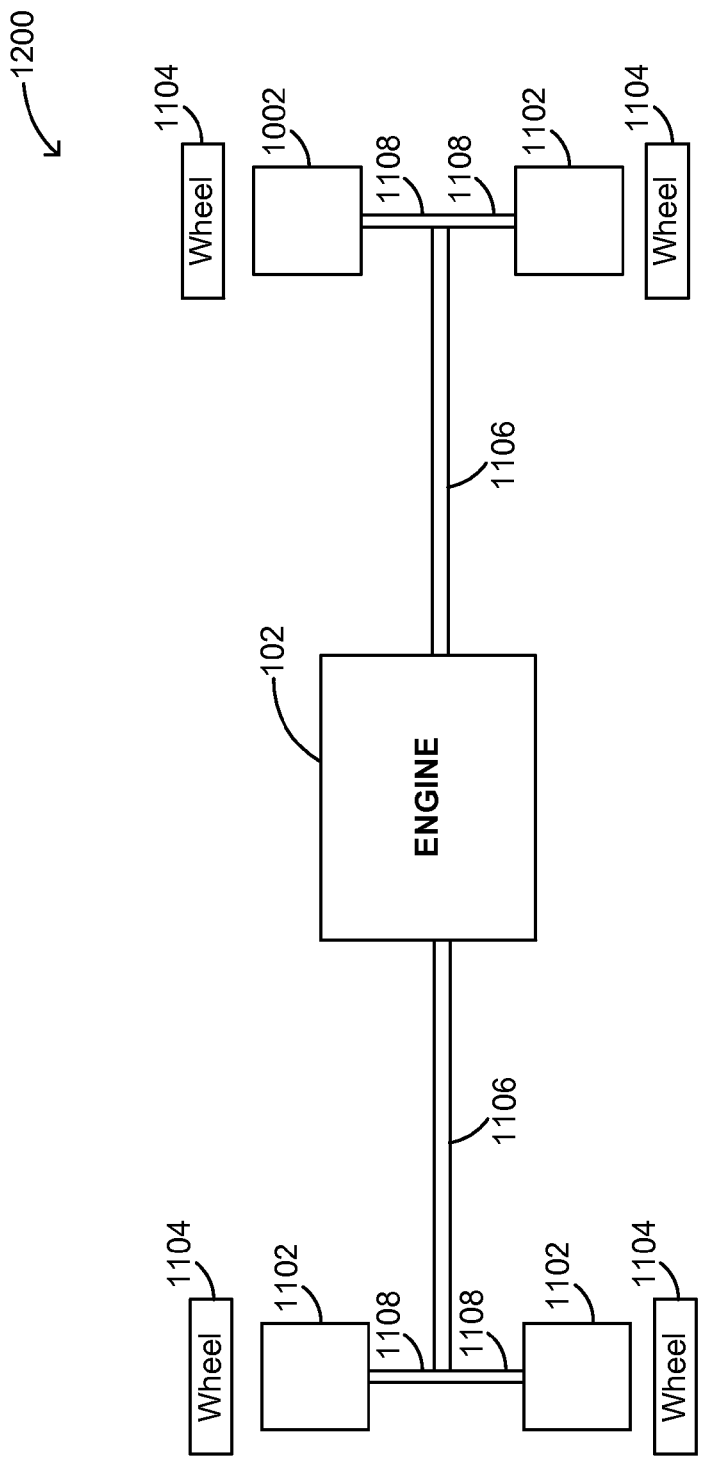
Figure 15:
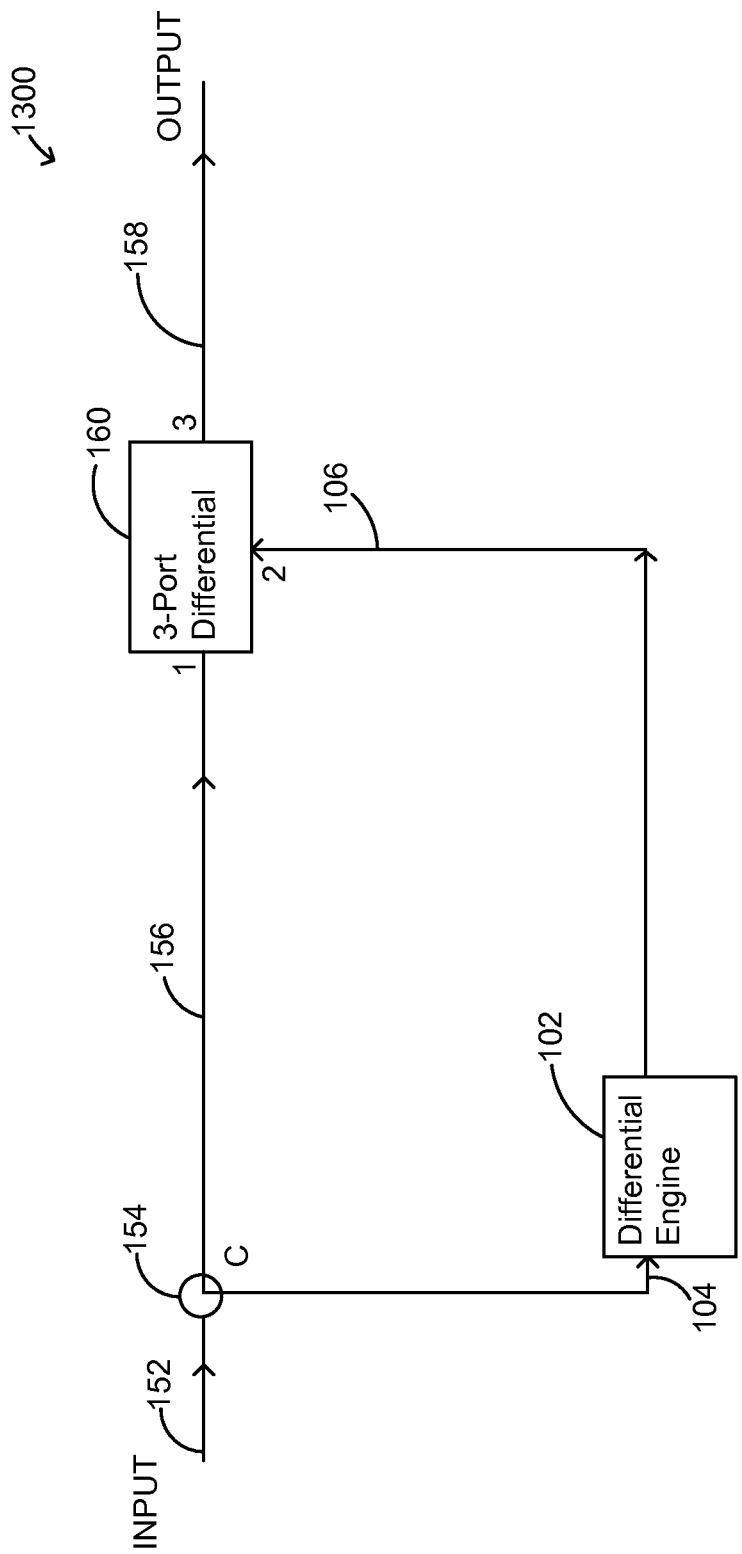
Figure 16:
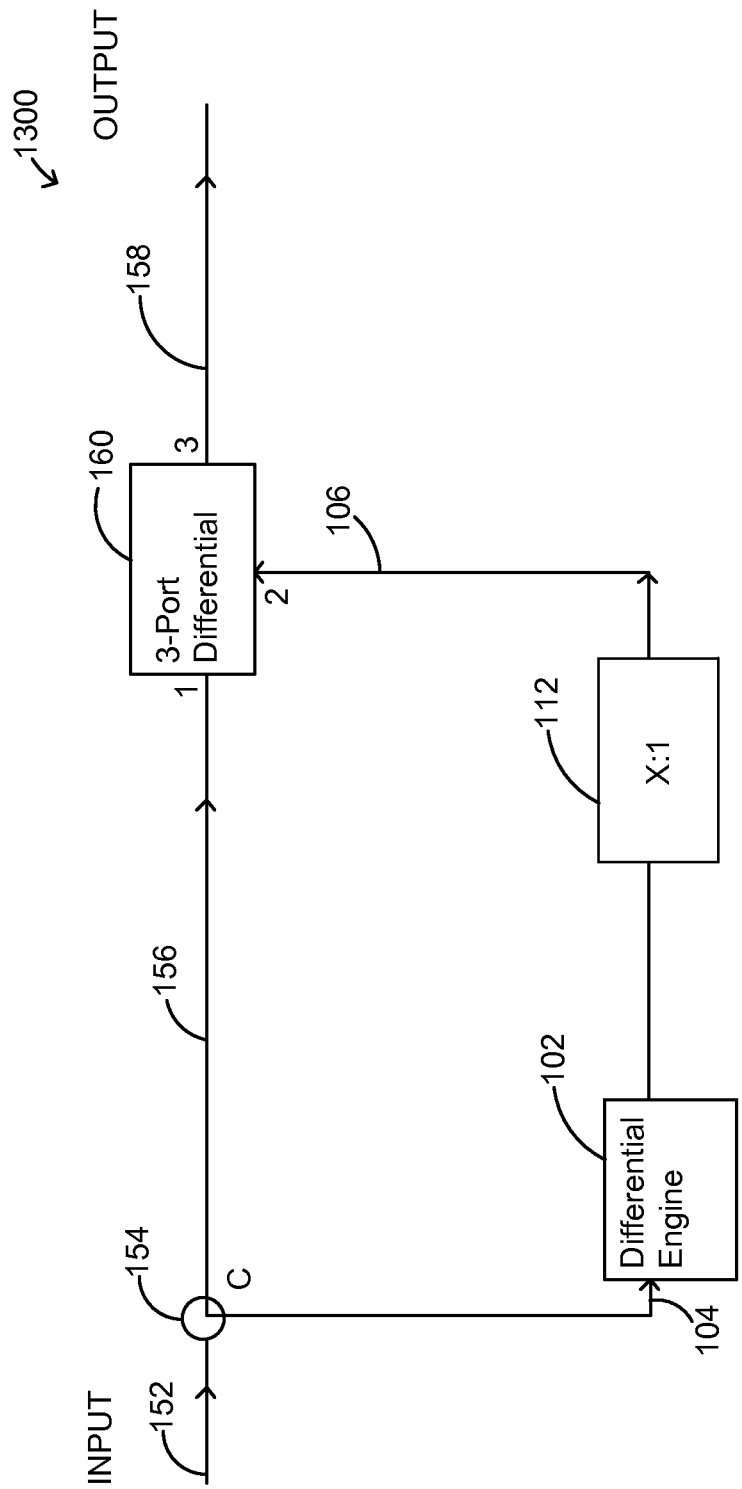
Figure 17:
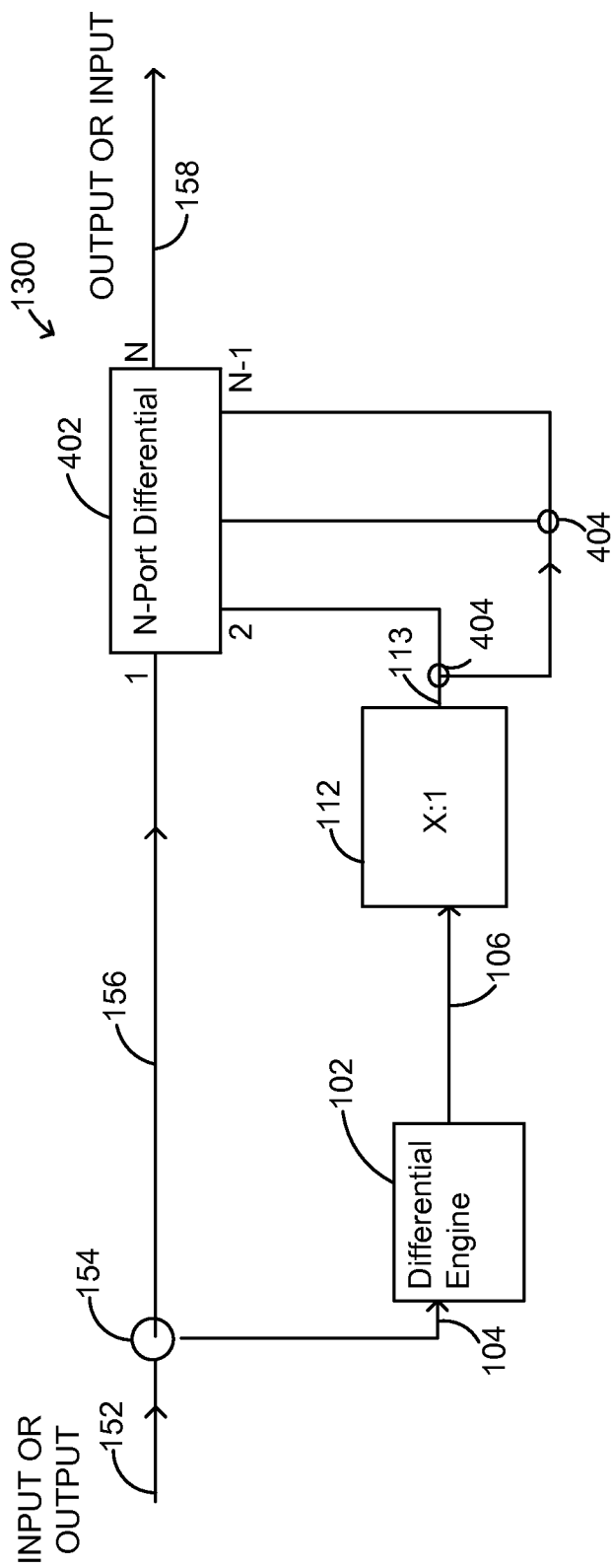
Figure 18:
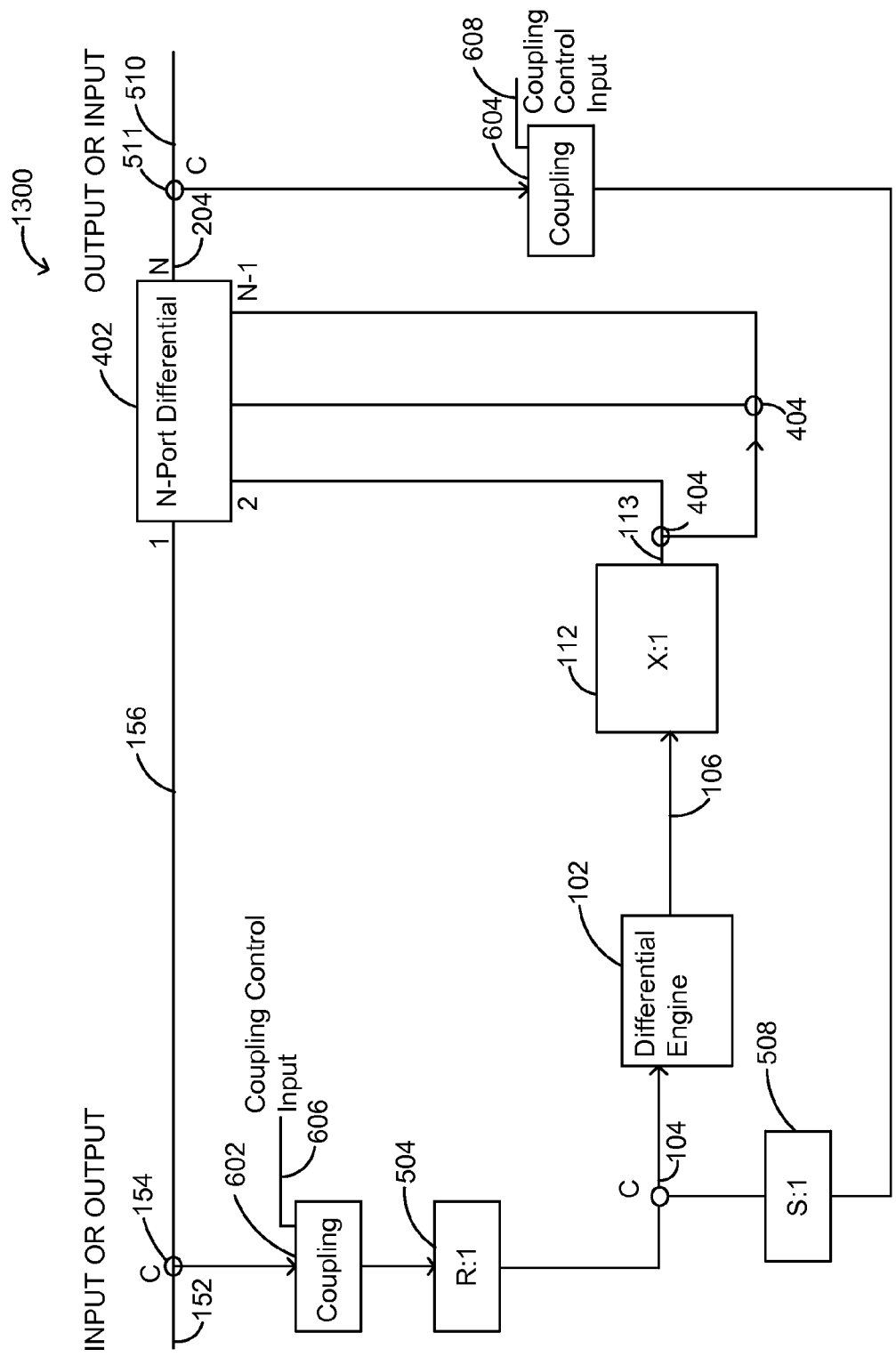
Figure 19:
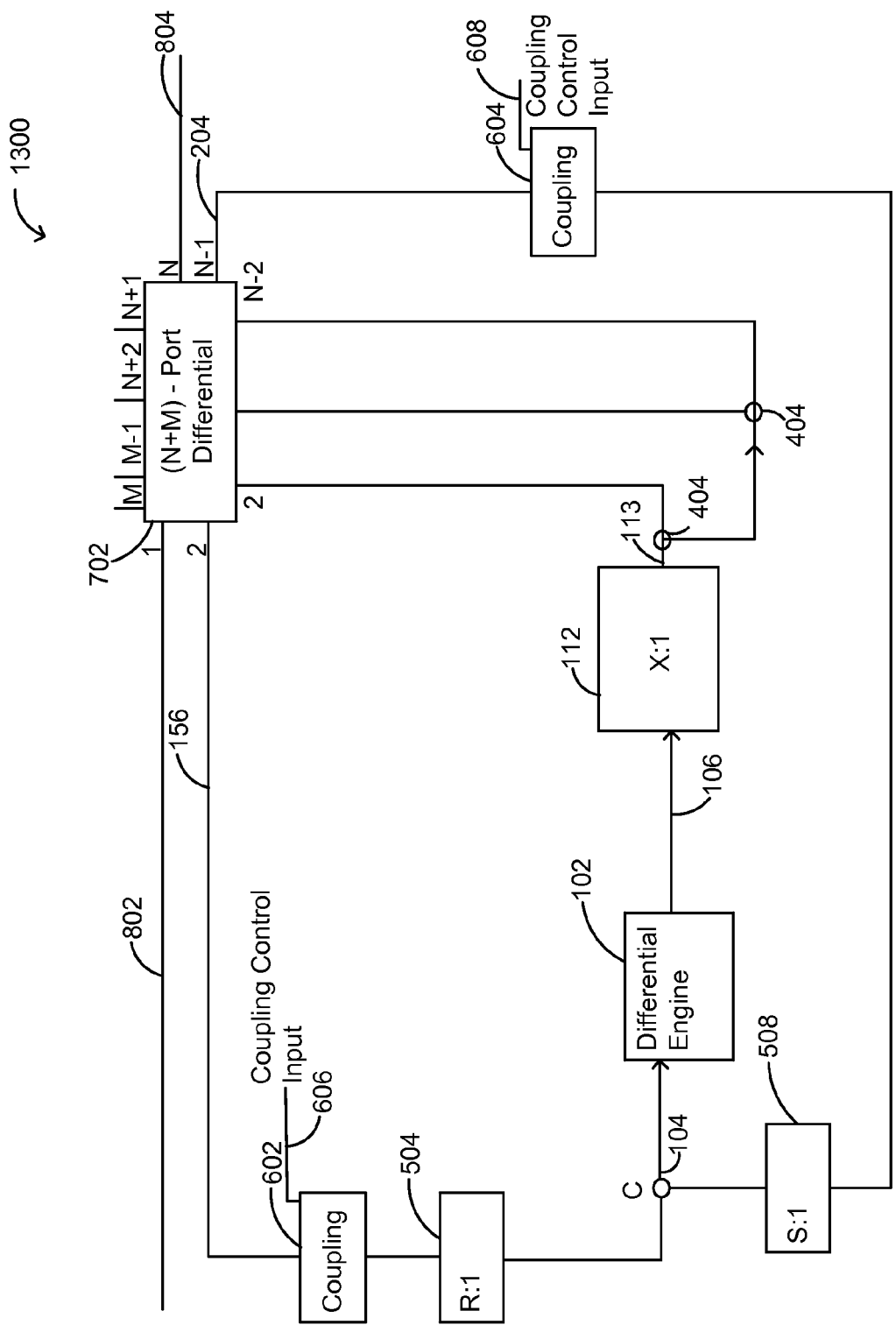

FIG. 7 is a block diagram of an N-port differential engine controlled transmission apparatus, in accordance with another embodiment FIG. 8 is a block diagram of an N-port differential engine controlled transmission apparatus, in accordance with another embodiment FIG. 9 is a block diagram of an N+M-port differential engine controlled transmission apparatus, in accordance with at least one embodiment;

FIG. 10 is a block diagram of an N+M-port differential engine controlled transmission apparatus, in accordance with another embodiment;

FIG. 11 is a block diagram of a differential engine controlled transmission apparatus in accordance with at least one embodiment FIG. 12 shows a block diagram illustrating a system of networked differential engine controlled transmission apparatus, in accordance with at least one embodiment;

FIG. 13 shows a block diagram of a 2-wheel powertrain, in accordance with at least one embodiment;

FIG. 14 shows a block diagram of a 4-wheel powertrain in accordance with at least one embodiment;

FIG. 15 shows a block diagram of a differential engine controlled transmission apparatus, in accordance with another embodiment;

FIG. 16 shows a block diagram of a differential engine controlled transmission apparatus, in accordance with another embodiment;

FIG. 17 shows a block diagram of a differential engine controlled transmission apparatus, in accordance with another embodiment;

FIG. 18 shows a block diagram of a differential engine controlled transmission apparatus, in accordance with another embodiment; and FIG. 19 shows a block diagram of the differential engine controlled transmission apparatus, in accordance with another embodiment.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

A description of an embodiment with several components in communication with each other does not imply that all such components are required. On the contrary a variety of optional components are described to illustrate the wide variety of possible embodiments of the present invention. Thus, the word "couple(d)" has been used throughout the application. Furthermore, "communication" includes the transfer of a physical attribute. Examples of physical attributes include energy, speed, power, and torque, among others.

As used herein and in the claims, the adjectives "input" and "output" do not define the directions of power transference through the elements to which the adjectives are applied. For example, the function of an "input" port may be limited to receiving power input, limited to delivering power output, or include both receiving power input and delivering power output.

Figure 1:
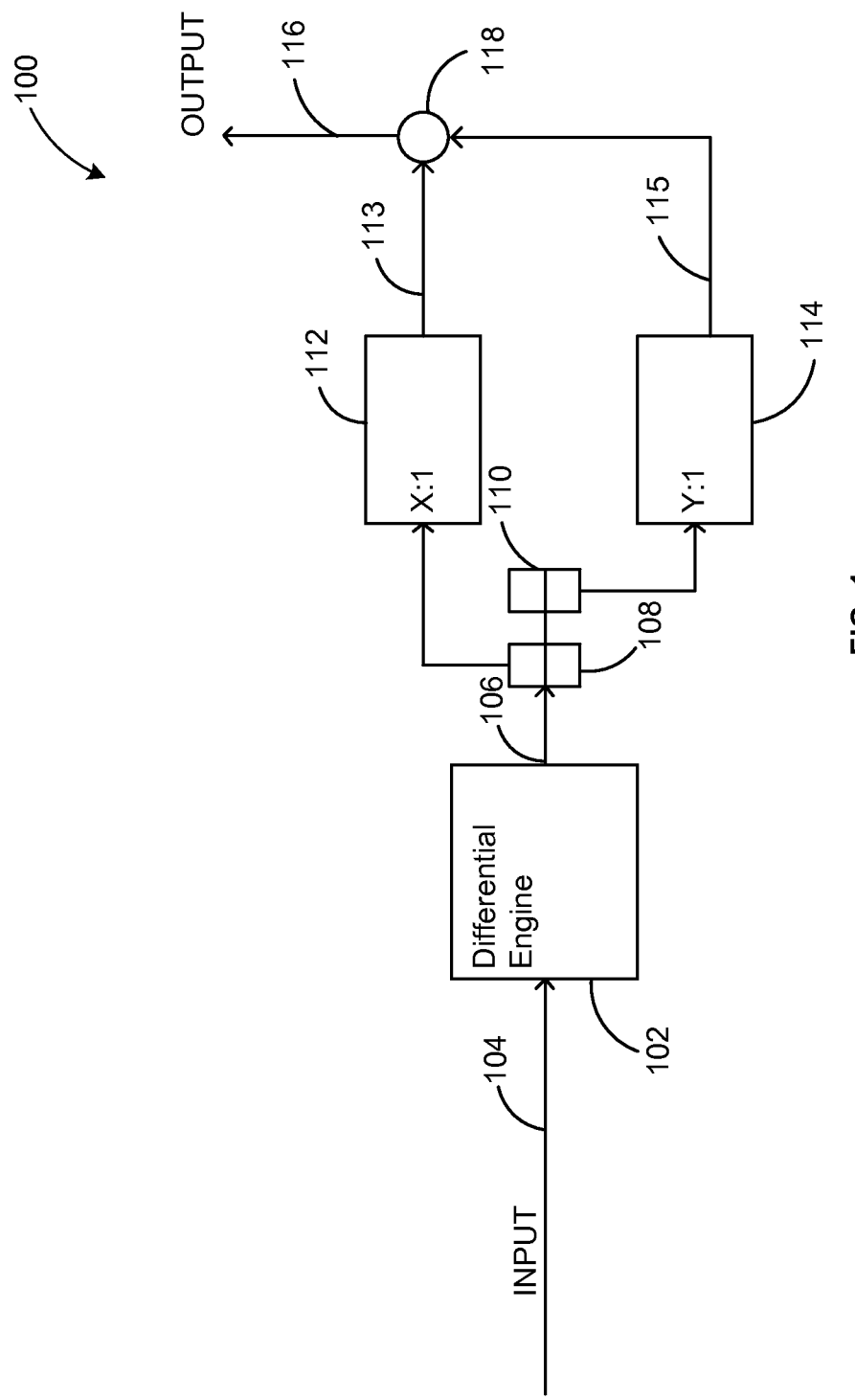
FIG. 1 is a block diagram of a differential engine controlled transmission apparatus, in accordance with at least one embodiment.

FIG. 1 shows a block diagram of a differential engine controlled transmission apparatus 100, in accordance with at least one embodiment. In the example shown, apparatus 100 includes a differential engine 102. Differential engine 102 as shown receives an input of speed and torque from a first input shaft 104, and selectively outputs speed and torque to a first output shaft 106. First output shaft 106 is shown coupled to first and second one way bearings 108 and 110. In at least one embodiment, first one way bearing 108 transmits speed and torque to a first torque converter 112 when first output shaft 106 rotates in a first direction, and second one way bearing 110 transmits speed and torque to a second torque converter 114 when first output shaft 106 rotates in a second direction, opposite the first.

The torque/speed conversion ratio of a torque converter, such as first and second torque converters 112 and 114, may be expressed as a ratio of output torque to input torque, or as a ratio of input speed to output speed. Optionally, first and second torque converters 112 and 114 have different torque conversion ratios. In one example, first and second torque converter 112 has a torque conversion ratio of 1:1, and second torque converter 114 has a torque conversion ratio of 5:1.

First and second torque converters 112 and 114 are shown including outputs 113 and 115, each coupled to a second output shaft 116 by a first output coupler 118. First output coupler 118 can be any suitable coupler, such as a differential gear box or a planetary gear set for example. In at least one embodiment, first output coupler 118 arithmetically combines the output speeds of output shafts 113 and 115. For example, when first output shaft 106 rotates, one of first and second one way bearings 108 and 110 will be engaged and one will be free-wheeling. In turn, one of outputs 113 and 115 of first and second torque converters 112 and 114 will have a non-zero speed, and one can have zero speed. In this example, first output coupler 118 (e.g. a differential gear box), rotates second output shaft 116 at an arithmetic combination of the zero and non-zero output speeds (i.e. at the non-zero speed) of outputs 113 and 115 of first and second torque converters 112 and 114. Accordingly, the speed and torque of second output shaft 116 may correspond to an arithmetic combination of the non-zero output speed and torque of outputs 113 and 115.

First output coupler 118 may provide one or more static or variable torque conversion ratios between each of inputs 113 and 115, and second output shaft 116. In one example, input 113 is configured to provide a 3:1 torque conversion ratio with second output shaft 116 (when input 115 is not rotating), and input 115 is configured to provide a 5:1 torque conversion ratio with second output shaft 116 (when input 113 is not rotating). In at least one embodiment, one or more of the torque conversion ratios is negative (e.g. −1:1) to invert the direction of rotation transmitted from the input shaft 113 or 115, to second output shaft 116.

One or both of input shafts 113 and 115 may be selectively locked to stop the shaft from rotating. In one example, an electrically, mechanically, or hydraulically activated brake may be coupled to one or more of input shafts 113 and 115 to prevent the rotation of that input shaft.

One or both of input shafts 113 and 115, and second output shaft 116 may be selectively disconnected from first output coupler 118 to prevent the transference of torque and speed. In one example, one or more of input shafts 113 and 115, and second output shaft 116 can be mechanically separated from first output coupler 118.

As used herein and in the claims, a coupler may be any suitable device that can transmit power between one or more rotary inputs and one or more rotary outputs. Illustrative examples include a differential gear box, a planetary gear set, and a differential engine. A coupler may include one or more brakes to apply a torque to slow or stop one or more of the inputs and outputs of the coupler. Further, a coupler may include one or more clutches to disconnect from one or more of the inputs and outputs of the coupler. A coupler may include one or more control signal inputs for selectively actuating the brake(s) and/or clutch(es). In some cases, a coupler may include a magnetic gear which can impart fixed or variable coupling forces. All of the inputs and outputs of the coupler, or any subset thereof may include the same or different fixed or variable speed or torque conversion ratios. The speed or torque conversion ratio of each input and output may be positive, negative, or variably positive or negative. A coupler may include one or more control signal inputs for selectively setting one or more of the speed or torque conversion ratio(s) of the input(s) and output(s) of the coupler. Embodiments herein that include more than one coupler may include all of the same couplers or a plurality of different couplers. Further, one coupler may be coupled to another coupler, and by this coupling the one coupler may exhibit control over the other coupler. For example, an input or output of one coupler may be connected with an input or output of another coupler.

In at least one embodiment, differential engine 102 can be controlled to selectively rotate first output shaft 106 in a desired direction and at a desired speed. The rotation direction of first output shaft 106 may be controlled to selectively engage one of first and second one way bearings 108 and 110 and therefore to use a selective one of first and second torque converters 112 and 114.

Figure 2A:
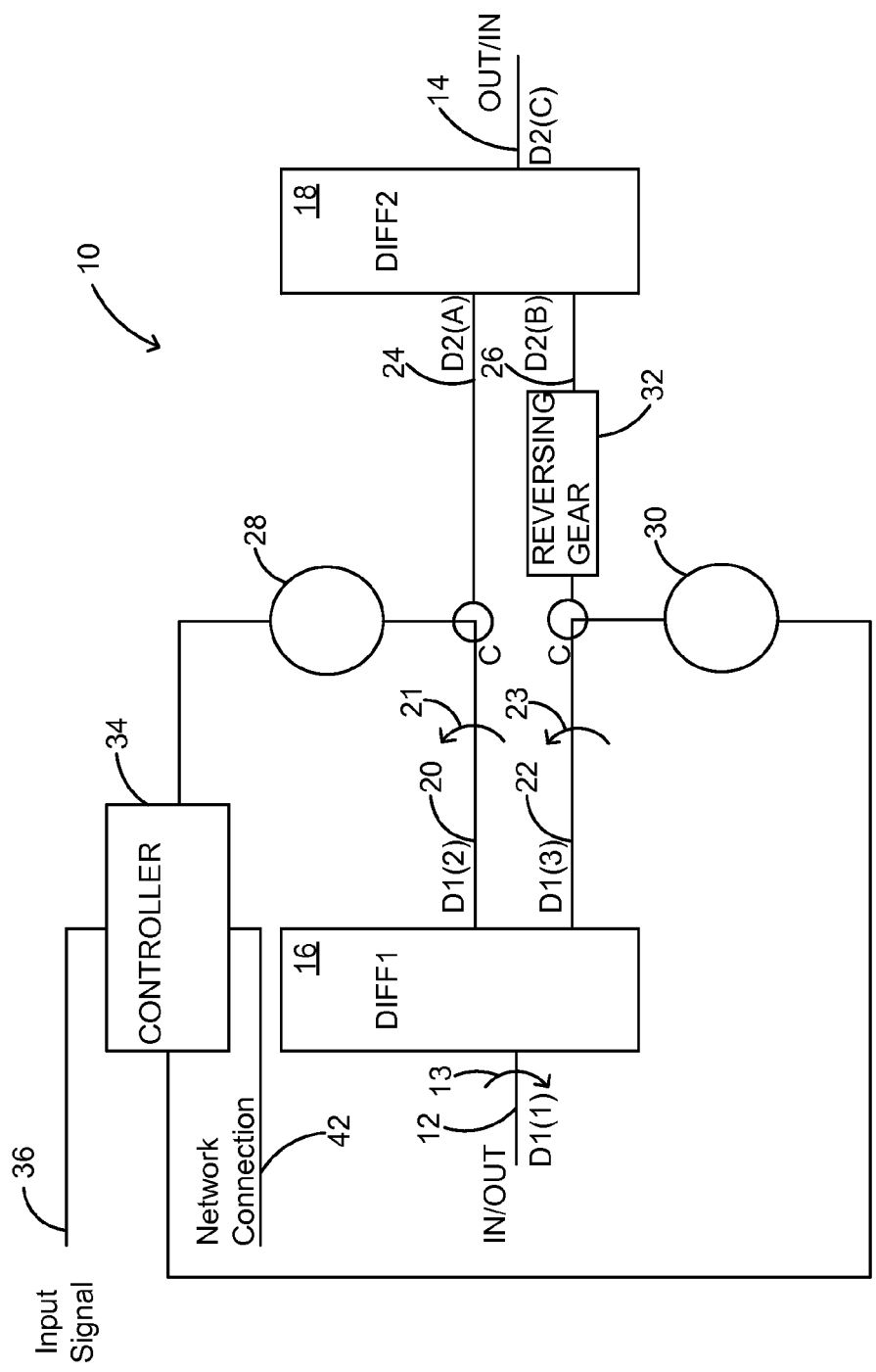
FIG. 2A is a block diagram of a differential engine that may be used in the differential engine controlled transmission apparatus of FIG. 1.

FIG. 2A shows a block diagram of a differential engine 10 that may be used in the differential engine controlled transmission apparatus 100 of FIG. 1. At least one suitable differential engine is described in, for example, U.S. Pat. Nos. 6,461,266 and 6,726,588, the entirety of which are hereby incorporated by reference.

Differential engine 10 as shown provides a variable speed conversion ratio between an input shaft 12 and an output shaft 14. In many cases, the most efficient output speed and torque of a rotary input source (e.g. a gasoline or electric motor) may not correspond with the speed and torque demanded by the circumstances. For example, many engines in conventional vehicles operate most efficiently at a particular speed (e.g. 2000 RPM) where there is an optimal torque and horsepower. In at least one embodiment, differential engine 10 may permit output shaft 14 to rotate at a speed that is independent of the speed of input shaft 12. This may permit a rotary input source (not shown) to drive shaft 12 at an optimally efficient speed, which is variably converted by differential engine 10 to rotate output shaft 14 at the speed demanded by the circumstances.

In some cases, input shaft 12 may be driven at an inconsistent speed and torque. In one example, input shaft 12 is driven by combined rotary input sources, such as an electric motor and a gasoline powered motor. Differential engine 10 may be controlled to apply a variable speed conversion ratio to the input speed to produce a steady output speed at output shaft 14 which satisfies the demands of the circumstances.

In the example shown, differential engine 10 includes a first differential gear box 16 and a second differential gear box 18. Input shaft 12 is coupled to the first differential gear box 16, and output shaft 14 is coupled to the second different gear box 18.

Figure 2B:
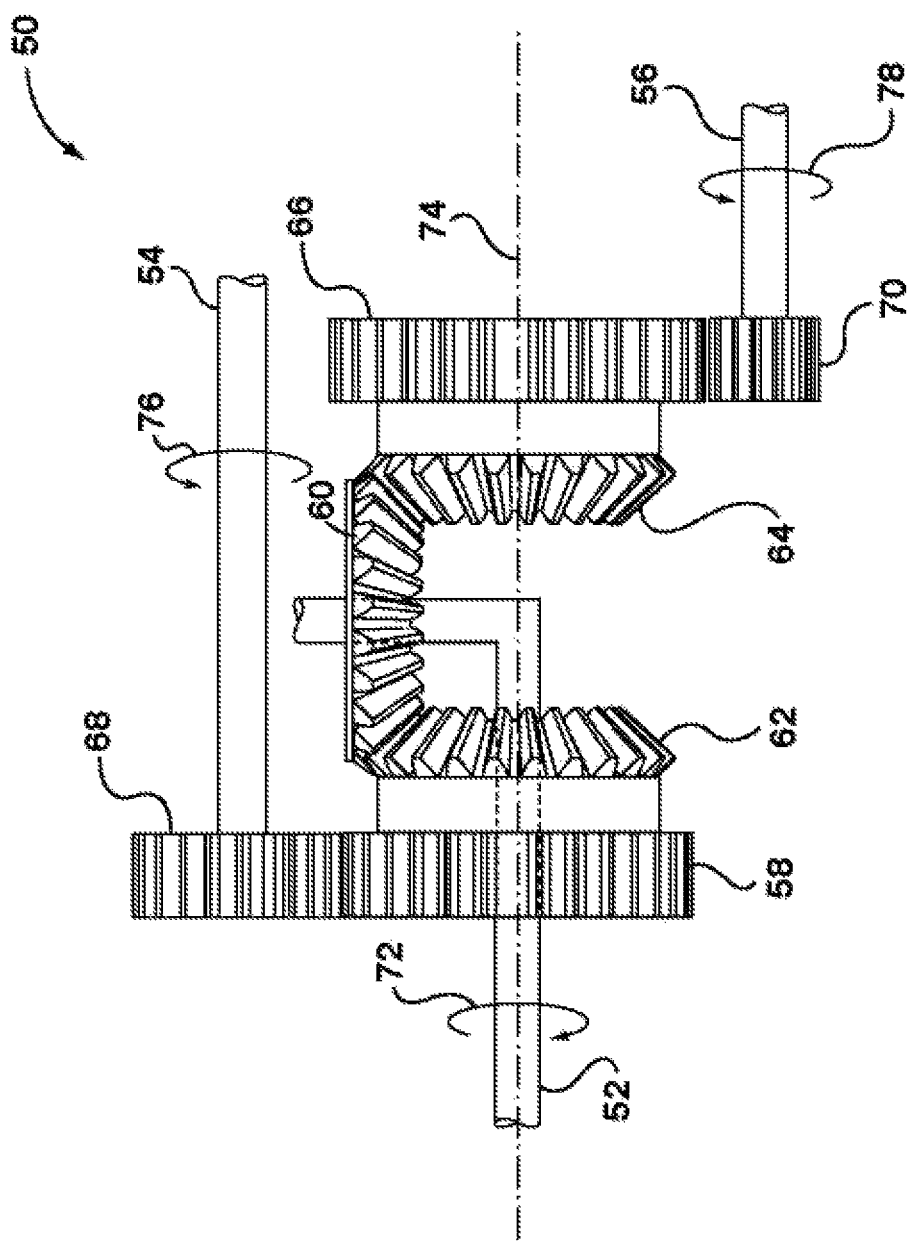
FIG. 2B is a differential gear box that may be used in the differential engine of FIG. 2A.

Reference is now made to FIGS. 2A and 2B. FIG. 2B shows an example of a differential gear box 50 that may be used in the differential engine 10. For example, one or both of differential gear boxes 16 and 18 may include a differential gear box 50. In alternate embodiments (not shown), one or both of differential gear boxes 16 and 18 may include an epicyclical gear, magnetic gears with fixed or variable coupling forces, or another differential engine, for example. As shown, differential gear box 50 includes three shafts 52, 54, and 56. At least one of the shafts is a driving input shaft, and at least one of the shafts is a driven output shaft.

In the example shown, right-angled shaft 52 extends through an opening in gear 58 and an opening in bevel gear 60. Gears 58 and 60 can rotate freely about shaft 52. Bevel gear 60 meshes with bevel gears 62 and 64. As shown, bevel gear 62 and gear 58 are coupled to rotate in synchronicity. Similarly, bevel gear 64 and gear 66 are shown coupled to rotate in synchronicity in this example. Gear 58 meshes with gear 68 which rotates in synchronicity with shaft 54. Gear 66 is meshed with gear 70 which rotates in synchronicity with shaft 56.

First differential gear box 16 is shown coupled to input shaft 12, and two output shafts 20 and 22. In this example, rotation of input shaft 12 is operable to drive both output shafts 20 and 22 in the same direction as illustrated by arrows 21 and 23. In one example, a differential gear box 50 is configured for use as first differential gear box 16 by using shaft 52 for input shaft 12 and shafts 54 and 56 for output shafts 20 and 22. In this example, rotation of input shaft 52 in the direction of arrow 72 rotates bevel gear 60 about axis 74 in the same direction. In turn, bevel gear 60 rotates gears 62 and 64, which drive gears 58 and 66 to rotate, all in the direction of arrow 72. In this example, rotating gear 58 in the direction of arrow 72 drives gear 68 and output shaft 54 to rotate in the opposite direction, as illustrated by arrow 76. Also, rotating gear 66 in the direction of arrow 72, in this example, drives gear 70 and shaft 56 to rotate in the opposite direction, as illustrated by arrow 78. As shown, output shafts 54 and 56 rotate in the same direction. Optionally, however, output shafts 54 and 56 rotate in opposite directions, e.g., by adding an idling gear.

In the example of differential gear box 50 configured for first differential gear box 16, the relative rotational speed of output shafts 54 and 56 depend on the load or resistive torque applied to each shaft 54 and 56. In a baseline example, if an equal resistive torque (e.g. no torque) is applied to each output shaft 54 and 56, then bevel gear 60 will rotate about axis 74 in synchronicity with gears 62 and 64 thereby driving shafts 54 and 56 at a baseline speeds.

Compared to this baseline example, if one of shafts 54 or 56 is loaded more than the other shaft 54 or 56, then the loaded shaft 54 or 56 will rotate slower than its baseline speed, and the other shaft 54 or 56 will rotate faster than its baseline speed.

For example, if one shaft 54 or 56 is stopped from rotating altogether, then all of the speed and torque from input shaft 52 is transferred to the other output shaft 54 or 56. In this example, the bevel gear 62 or 64 of the arrested shaft 54 or 56 does not rotate. As bevel gear 60 pivots about axis 74, bevel gear 60 is forced to rotate about its own axis as the teeth of bevel gear 60 rollingly engage the stationary bevel gear 62 or 64 of the arrested shaft 54 or 56. The rotation of bevel gear 60 about axis 74 in combination with its rotation about its own axis drives the free bevel gear 62 or 64 to rotate at a speed faster than its baseline speed.

In the example of FIG. 2A, differential engine 10 includes motor/generators 28 and 30. As shown, motor/generator 28 is coupled to output shaft 20 and can operate as a motor to decrease the load on output shaft 20, or as a generator to increase the load on output shaft 20. Similarly, motor/generator 30 is shown coupled to output shaft 22 and can operate as a motor to decrease the load on output shaft 22, or as a generator to increase the load on output shaft 22. As discussed above, the difference between the rotational speeds of output shafts 20 and 22 can be controlled by selectively controlling the relative loading of output shafts 20 and 22. Motor/generators 28 and 30 as shown provide control over the relative loading of output shafts 20 and 22.

Second differential gear 18 may also comprise a second differential gear box 50, with the inputs and outputs reversed as compared with the example of first differential gear 16 above. In this example, gear box 50 includes input shafts 54 and 56, and an output shaft 52. As shown, driving input shafts 54 and 56 causes bevel gears 62 and 64 to rotate. Bevel gear 60 and output shaft 52, as shown, will rotate about axis 74 at half of the sum of the rotational speeds of bevel gears 62 and 64. For example, if bevel gears 62 and 64 rotate at equal speeds but in opposite directions, then bevel gear 60 and output shaft 52 will not rotate about axis 74. Instead, bevel gear 60 will only rotate about its own axis. Accordingly, in the example of FIG. 2A, the output speed and direction of output shaft 14 can be controlled by selectively controlling the relative speeds of input shafts 24 and 26. In another example, if bevel gears 62 and 64 rotate at equal speeds in the same direction, then bevel gear 60 and output shaft 52 will rotate about axis 74 at that same speed and direction. This may be achieved by one of motor/generators 28 and 30 applying sufficient energy to reverse the direction of rotation of the shaft 21 or 23 that is coupled to that motor/generator 28 or 30.

In the example shown, output shaft 20 is coupled to input shaft 24 so that they rotate at the same speed and in the same direction. Further, output shaft 22 is shown coupled to input shaft 26 by way of a reversing gear 32, so that input shaft 26 rotates at the same speed as output shaft 22 but in an opposite direction. Reversing gear 32 can be any suitable gear or gear set that reverses the direction of rotation. In the simplest example, reversing gear 32 is a pair of meshed spur gears.

Since, in the example shown, output shafts 20 and 22 rotate in the same direction, input shafts 24 and 26 rotate in opposite directions. In the example of a differential gear box 50 configured for second differential gear box 18, rotating shafts 54 and 56 in opposite directions rotates beveled gears 62 and 64 in opposite directions. Recalling that, in the example shown, output shaft 52 rotates at half of the sum of the speeds of bevel gears 62 and 64, output shaft 52 in this example rotates in the direction of the bevel gear 62 or 64 having the faster rotational speed. Returning to FIG. 2A then, the direction (and speed) of output shaft 14 can be selected by controlling the relative speeds of input shafts 24 and 26. In the example shown, this is accomplished by selectively applying loads to output shafts 20 and 22 using motor/generators 28 and 30, where the energy from the one of motor/generators 28 and 30 which is acting as a generator is converted by controller 34 into an energy level that can drive the other of motor/generators 28 and 30 to act as a motor to provide additive rotational force on the shaft 20 or 22 to which it is connected. This may permit the energy generated by the one of motor/generators 28 or 30 from the load of the shaft 20 or 22 to which it is connected to be kept within the apparatus. In turn, this may avoid the need for external energy to create the variation in speed between the 'input' and 'output' of the differential engine 10 shown in FIG. 2A.

Differential engine 10 includes a controller 34. Controller 34, as shown, controls motor/generators 30, e.g., electrically, hydraulically, or mechanically, to selectively apply loads to output shafts 20 and 22 and thereby control the speed and direction of output shaft 14. In this way, differential engine 10 provides variable speed conversion. In the example shown, controller 34 receives control signals 36 from, e.g., one or more of torque and speed sensors (not shown) on output shaft 14. For example, a control signal 36 may be received from the speedometer of a vehicle. Controller 34 may reference the control signals 36, as a feedback loop, for controlling motor/generators 28 and 30 to achieve the output speed at output shaft 14 demanded by the circumstances.

In at least one embodiment, a plurality of differential engines 10 may communicate with one another to coordinate the speed and torque of their respective output shafts 14. For example, controller 34 may send and receive network signals 42 to and from other differential engines 10.

Returning to FIG. 1, apparatus 100 may operate in reverse in at least one embodiment. For example, second output shaft 116 may be an input and first input shaft 104 may be an output. Coupler 118 may transmit power from second output shaft 116 rotating in a first direction to differential engine 102 through one of one-way bearings 108 and 110 (and the corresponding torque converter 112 or 114), and transmit power from second output shaft 116 rotating in a second direction to differential engine 102 through the other of one-way bearings 108 and 110 (and the corresponding torque converter 112 or 114).

Typically, a one-way bearing transmits power when the one-way bearing is driven in one direction by the shaft it is coupled to, or when the one-way bearing is driven in the opposite direction driving the shaft it is coupled to. In some cases, coupler 118 may control the directionality of output to shafts 113 and 115, independent of the directionality of second output shaft 116. Coupler 118 may further brake or otherwise disengage the output shaft 113 or 115 through which power is not intended to be transferred or otherwise control the transfer of power to output shaft(s) 113 and/or 115. In some embodiments, coupler 118 has an input for control signals which direct coupler 118 to selectively transfer power through one of torque converters 112 and 114).

Figure 3:
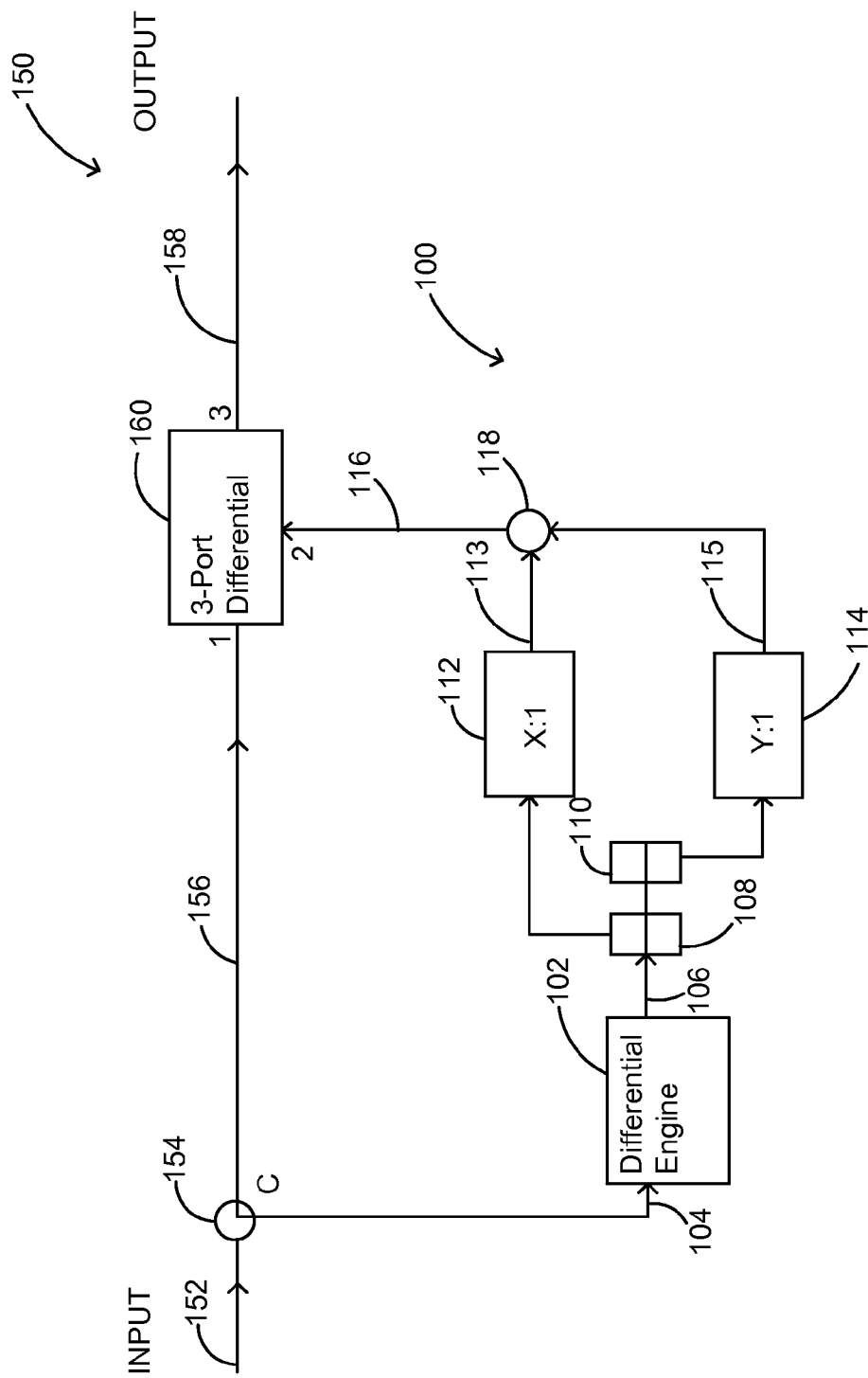
FIG. 3 is a block diagram of a 3-port differential engine controlled transmission apparatus, in accordance with at least one embodiment.

FIG. 3 shows a block diagram of a 3-port differential engine controlled transmission apparatus 150 in accordance with at least one embodiment. In the example shown, apparatus 150 includes an input shaft 152 coupled by an input coupler 154 to a second input shaft 156 and a first input shaft 104 to an apparatus 100. Input coupler 154 can be any suitable device, such as differential gear box 50 or another differential or epicyclical gear, which can divide the rotary power of input 152 between first and second input shafts 104 and 156.

As shown, second input shaft 156 and second output shaft 116 of apparatus 100 are coupled to a third output shaft 158 by a 3-port differential 160. 3-port differential 160 may comprise a differential gear such as a differential gear box 50, for example. In alternative embodiments, S-port differential 160 may comprise an epicyclical gear (not shown) having a star gear, a plurality of planetary gears, and a ring gear. In this case, each of the star gear, a carrier for the planetary gears and the ring gear may provide a port that may be connected to an input or output shaft. For example, second input shaft 156 and second output shaft 116 may be connected to two of the star gear, carrier and ring gear, and third output shaft 158 may be connected to third of the star gear, carrier and ring gear. In at least one embodiment, third output shaft 158 rotates at a speed which is the arithmetic sum of the speeds of second input shaft 156 and second output shaft 116. Optionally, 3-port differential 160 is configured to provide a torque conversion ratio to the ports of 3-port differential 160 which connect to second input shaft 156 and second output shaft 116.

In operation, apparatus 150 can vary the output speed of third output shaft 158 from zero to greater than the input speed at 152 by controlling differential engine 102 and first output coupler 118. In a first example, first output shaft 106 from differential engine 102 is controlled or allowed to freewheel (which can be accomplished regardless of whether shaft 104 is rotating in either direction or stopped) such that second output shaft 116 can free-wheel, and a nominal load is applied to third output shaft 158. In this example, the output speed at third output shaft 158 is zero (or possibly non-zero if driven by the load), and all of the input power from input 152 (a product of speed and torque) passes to second input shaft 156, if third output shaft 158 is at zero speed, and out to free-wheeling second output shaft 116 (although without a load on second output shaft 116 there may be no draw of power).

In a second example, first output coupler 118 applies a brake to lock the rotation of second output shaft 116, or differential engine 102 applies a braking torque through coupler 118 to prevent shaft 116 from rotating or other combinations or torques are applied through coupler 118 which prevent shaft 116 from turning. In this example, the output speed at third output shaft 158 is equal to the speed of second input shaft 156, divided by any torque conversion ratio applied to second input shaft 156.

In a third example, first output coupler 118 couples the rotational speed of shafts 113 and/or 115 to second output shaft 116. In this example, apparatus 100 applies a resistive rotational torque to second output shaft 116 slowing the rotational speed of second output shaft 116 as compared to the first example, and third output shaft 158 rotates at a speed between the first and second examples above.

In a fourth example, first output coupler 118 couples the rotation speed of shafts 113 and/or 115 to second output shaft 116. In this example, apparatus 100 applies a rotational torque to second output shaft 116 in a direction opposite to the rotational direction of second output shaft 116 when it free-wheels as in the first example. Third output shaft 158 rotates at a speed greater than in the first example.

In at least one embodiment, apparatus 150 uses a differential engine 102 in combination with selectable first and second torque converters 112 and 114, and 3-port differential 160 to provide a wider or amplified range of speed and torque conversion ratios as compared with using differential engine 102 alone. In at least some differential engines, the speed and torque conversion ratio is limited by the size of its motor/generators. Accordingly, for a given size of differential engine (such as differential engine 102) there may be a limited range of speed and torque conversion ratios. In at least one embodiment, apparatus 150 expands the range of torque conversion ratios by selectively coupling differential engine 102 with first and second torque converters 112 and 114. First and second torque converters 112 and 114 may provide mechanical torque conversion ratios which can amplify the torque conversion ratio provided by differential engine 102. This may permit apparatus 150 to use a smaller, and potentially less expensive, differential engine 102 to produce a desired range of torque conversion ratios, as compared with using differential engine 102 alone.

Figure 4:
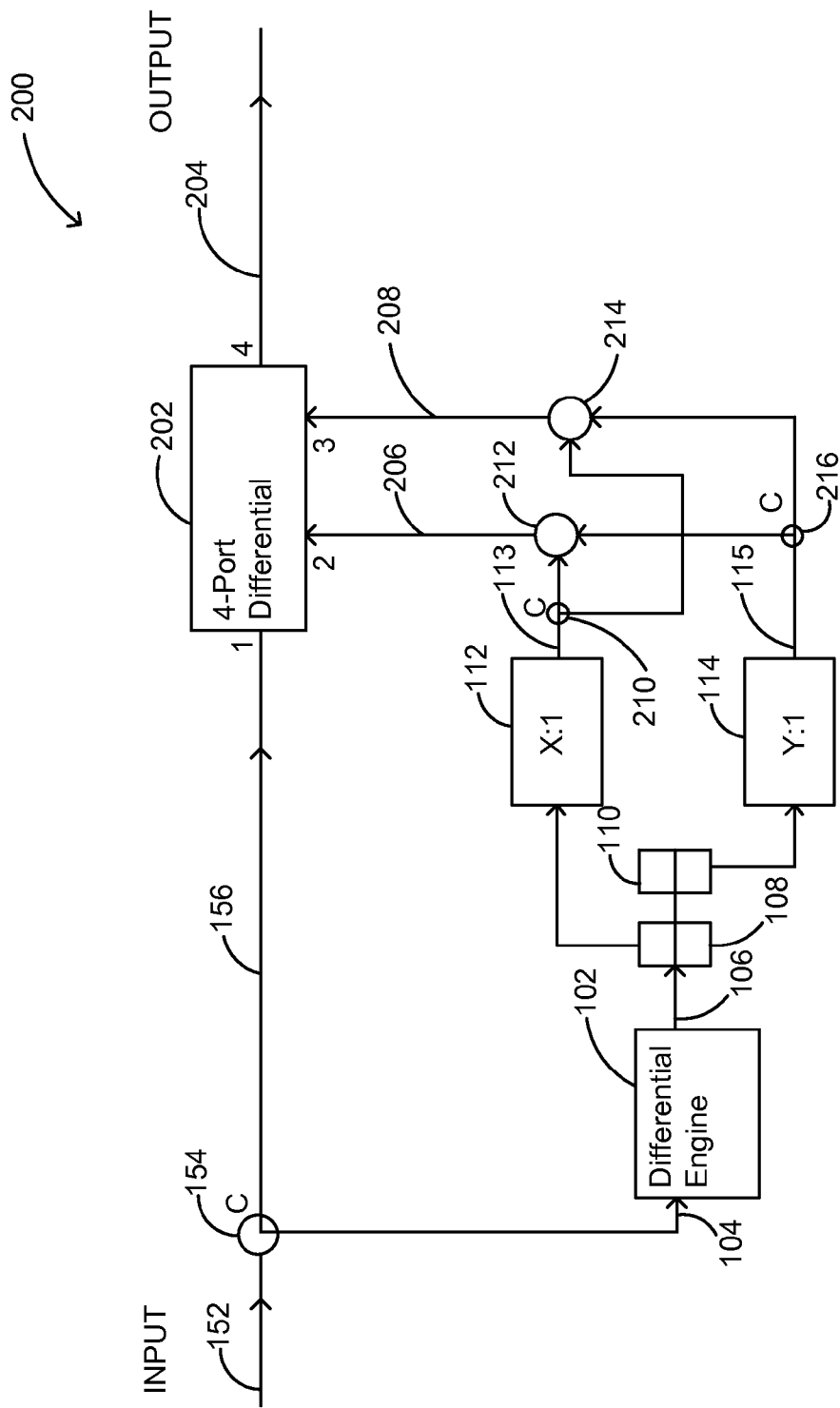
FIG. 4 is a block diagram of a 4-port differential engine controlled transmission apparatus, in accordance with at least one embodiment.

FIG. 4 shows a block diagram of a 4-port differential engine controlled transmission apparatus 200, in accordance with at least one embodiment. Elements of apparatus 200 that are identified with the same reference numeral as elements described above are analogous to those elements. As shown, apparatus 200 includes a 4-port differential 202. In at least one embodiment, apparatus 200 may provide more granular control over the torque conversion ratio between input 152 and third output shaft 204.

In the example shown, input shaft 152 is coupled to an input coupler 154 which divides the input power (i.e. speed and torque) between second input shaft 156, and first input shaft 104 to differential engine 102. In this example, a 4-port differential 202 receives inputs from a second input shaft 156, and second and fourth output shafts 206 and 208 which are coupled to first input shaft 104. The elements between first input shaft 104 and output shafts 113 and 115 of first and second torque converters 112 and 114 are substantially as described above with reference to FIGS. 1 to 3.

As shown, the power of output shaft 113 of first torque converter 112 can be coupled to either or both of second and fourth output shafts 206 and 208 via first intermediate coupler 210, first output coupler 212, and second output coupler 214. Similarly, the power of output shaft 115 of first torque converter 112 can be coupled to either or both of second and fourth output shafts 206 and 208 via first intermediate coupler 216, first output coupler 212, and second output coupler 214. In at least one embodiment, couplers 210, 212, 214 and 216 may be analogous to first output coupler 118 described above. In one example, first intermediary coupler 210 may include a controllable brake and/or clutch or other means at each of its two outputs to control the transfer of power between second and fourth output shafts 206 and 208 and shaft 113. Similarly, second intermediary coupler 216 may include a controller brake and/or clutch or other means at each of its two outputs to control the transfer of power between second and fourth output shafts 206 and 208 and shaft 115.

In the examples described above, the control of the transfer of power between input shaft 104 and 4-port differential 202 through differential engine 102 and any of up to six or more paths. In one example, the power of first input shaft 104 may be transferred through first torque converter 112 to one or both of second and fourth output shafts 206 and 208, or through second torque converter 114 to one or both of second and fourth output shafts 206 and 208. 4-port differential 202 may be configured with gearing to provide different torque conversion ratios for each of the ports connected to second and fourth output shafts 206 and 208. Each path may provide a different torque conversion ratio (or potentially range of torque conversion ratios). This may permit the range of variable speed conversion ratios and torque output available through control of differential engine 102 to be amplified by the torque conversion ratio of a selected path. In some cases, the ranges of torque conversion ratios of one or more of the paths may overlap or be identical. Optionally, one or more ports of 4-port differential 202 can be selectively locked (i.e. prevented from rotating), or disconnected ("free-wheel", i.e. freely rotate without transmitting power).

Figure 5:
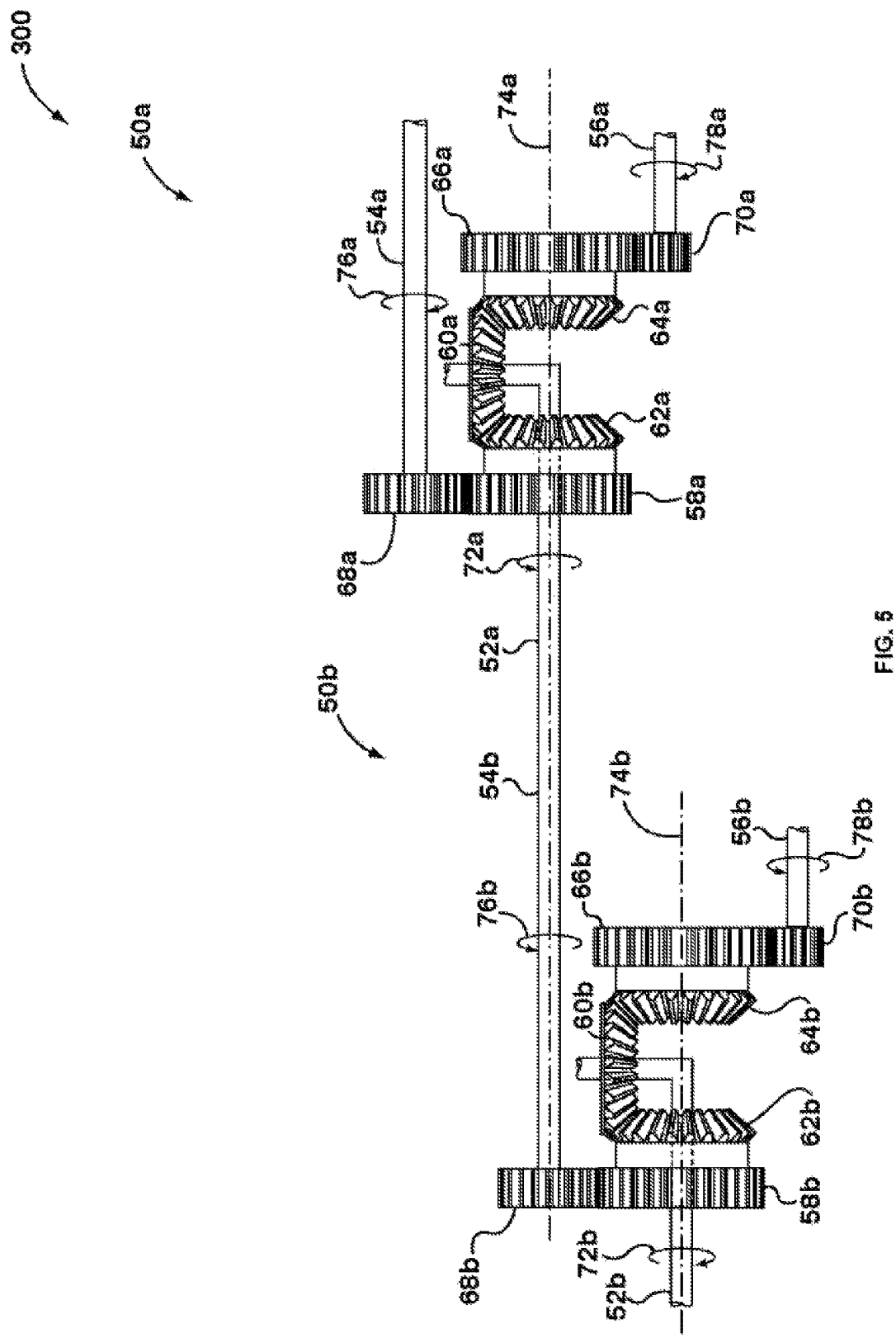
FIG. 5 is a 4-port differential that may be used in the 4-port differential engine controlled transmission apparatus of FIG. 4.

In the example shown, 4-port differential 202 may provide the same or a different torque conversion ratio for each of the ports for second and fourth shafts 206 and 208. In at least one embodiment, 4-port differential 202 is a pair of 3-port differential gear boxes connected in series. FIG. 5 shows a 4-port differential 300 that may be used in the apparatus 200. For example, 4-port differential 202 may comprise the 4-port differential 300 shown in FIG. 5. In the example shown, 4-port differential 300 includes a first differential gear box 50*a* (component labels are annotated with "a") connected in series with a second differential gear box 50*b* (component labels are annotated with "b"). Output 52*a* of first differential gear box 50*a* as shown drives input 54*b* of second differential gear box 50*b*. The four ports of differential 300 are shafts 54*a*, 56*a*, 56*b* and 52*b*. In alternative embodiments, 4-port differential 202 may comprise two epicyclical gear sets connected in series (not shown). For example, each of the epicyclical gear sets may include three ports: a sun gear, a carrier connecting a plurality of planetary gears and a ring gear. A port from each planetary gear set may be interconnected, and the remaining two ports of each planetary gear set may provide four useable ports.

In one example, 4-port differential 300 is configured for 4-port differential 202 of apparatus 200. In this example, shafts 54*a*, 56*a* and 56*b* correspond to shafts 156, 206 and 208, and shaft 52*b* corresponds to third output shaft 204. In at least one embodiment, the relative sizing of gears 68*a*, 70*a*, and 70*b* can be chosen to select torque conversion ratios for each of the input ports. Other parameters, such as the size of gears 58*a*, 70*a* and 66*b* may also be chosen to select a torque conversion ratio for each of the four ports.

Figure 6:
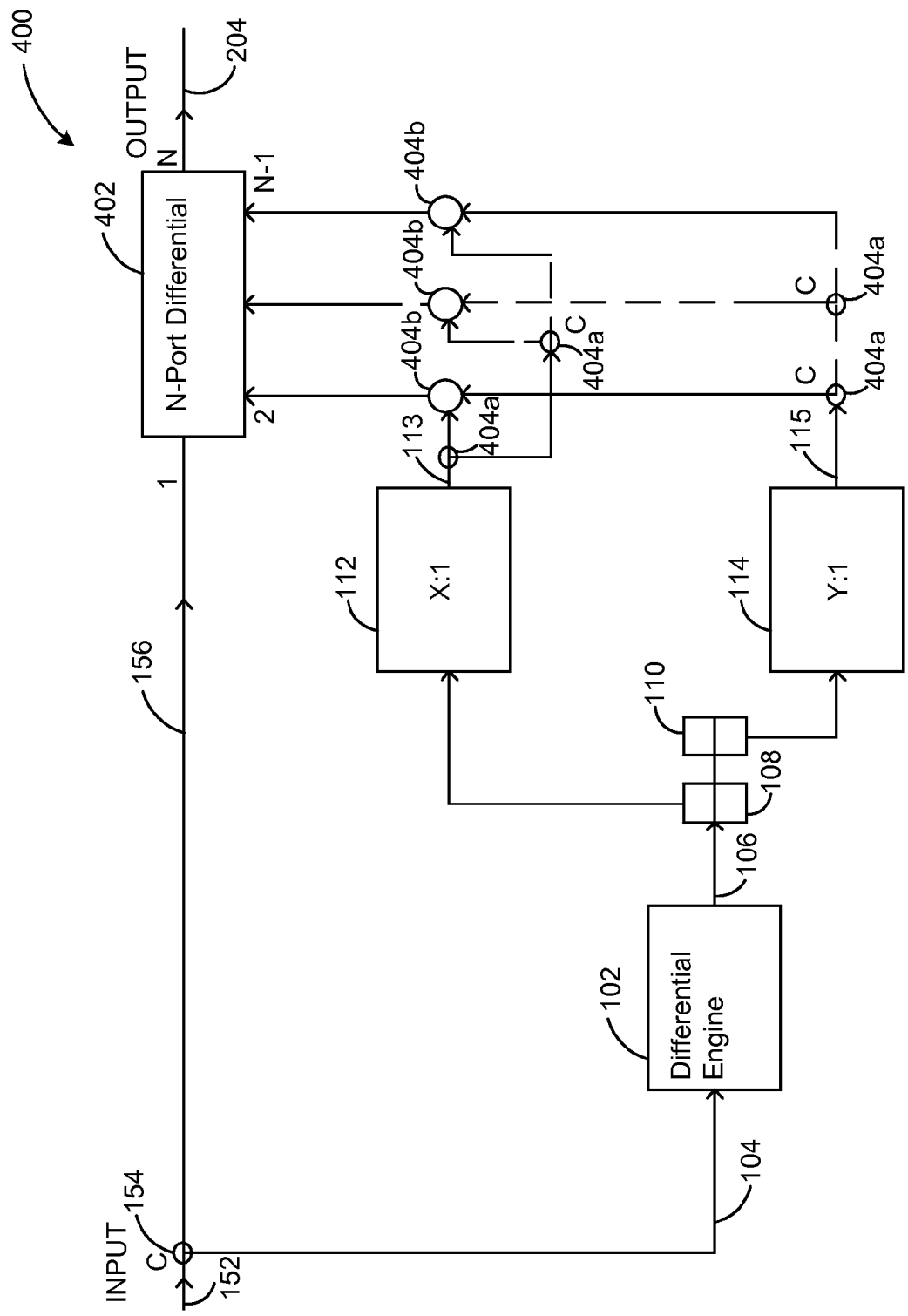
FIG. 6 is a block diagram of an N-port differential engine controlled transmission apparatus, in accordance with at least one embodiment.

FIG. 6 shows a block diagram of an N-port differential engine controlled transmission apparatus in accordance with another embodiment. Elements of apparatus 400 that are identified with the same reference numeral as elements described above are analogous to those elements. Apparatus 400, as shown, includes an N-port differential 402 having N ports (e.g. 3 or more ports), which may provide a plurality paths for transferring power from first input shaft 104 to N-port differential 402. In at least one embodiment, this may provide more granular control over the torque conversion ratio between input 152 and third output shaft 204.

In the example shown, power from first input shaft 104 is coupled to one or more of (N−2) ports of N-port differential 402. As shown, the power from first input shaft 104 can be transferred through differential engine 102 to one of first and second torque converters 112 and 114 depending on the rotation direction of first output shaft 106, as discussed above. Output shafts 113 and 115, as shown, can be selectively coupled to one or more of the (N−2) ports of N-port differential 402 which can provide a multiplicity of different pathways from each of output shafts 113 and 115 to N-port differential 402. Each of the (N−2) ports of the N-port differential 402 may optionally provide different torque conversion ratios. Optionally, one or more ports of N-port differential 402 can be selectively locked (i.e. prevented from rotating), disconnected ("free-wheel", i.e. freely rotate without transmitting power), or made to rotate at a controlled speed.

In total, the illustrated example can provide a multiplicity of paths for transferring power from first output shaft 106 to N-port differential 402. As shown, differential engine apparatus 400 includes a plurality of intermediate couplers 404*a* and output couplers 404*b* which can be controlled to selectively couple output shafts 113 and 115 to one or more of the (N−2) ports of N-port differential 402. Couplers 404*a* and 404*b* may be analogous to first output coupler 118 described above. As well, each coupler 404*a* and 404*b* may be different from any of the other couplers 404*a* and 404*b*. In one example, a coupler 404*a* or 404*b* includes one or more electrically, mechanically or hydraulically actuated brakes and/or clutches for slowing, stopping or disconnecting the rotation of one or more outputs of the coupler 404*a* or 404*b*.

In at least one embodiment, a different torque conversion ratio (or range of torque conversion ratios) is provided by each path between differential engine 102 and N-port differential 402 (e.g. including the torque conversion ratio of the (N−2) ports). This may permit the use of a smaller, and potentially less expensive, differential engine 102 that can provide a limited range of speed and torque conversion ratios. For example, the limited range of speed and torque conversion ratios may be expanded to a wide range by multiplying the speed and torque conversion ratio across differential engine 102 by the torque conversion ratio of a selected path.

FIG. 7 shows a block diagram of an N-port differential engine controlled transmission apparatus 500 in accordance with another embodiment. Elements of apparatus 500 that are identified with the same reference numeral as elements described above are analogous to those elements. Transmission apparatus 500, as shown, includes an N-port differential 402 having N ports (e.g. 3 or more ports), similar to apparatus 400.

In the example shown, at least some power from one of input shafts 152 or third output shaft 204 can be coupled to differential engine 102. Input shaft 152 is shown coupled to first input shaft 104 of differential engine 102, by way of an input on/off coupler 502 and optionally a torque converter 504. Similarly, third output shaft 204 is shown coupled to first input shaft 104, by way of an output on/off coupler 506 and optionally a torque converter 508. In at least one embodiment, an on/off coupler has at least two modes. In the first mode, the coupler can permit power to transfer from an input shaft to an output shaft. In the second mode, the coupler can prevent the rotation of at least the input shaft (e.g. by braking or disengaging a clutch or other means).

A coupler 511 couples third output shaft 204, output shaft 510, and an output to on/off coupler 506. In a first two examples, input on/off coupler 502 is on and output on/off coupler 506 is off.

In the first example, coupler 154 divides power transferred via input shaft 152 between first and second input shafts 104 and 156. In this example, substantially all of the power transferred via input shaft 152 is transmitted to output shaft 510 by way of N-port differential 402, third output shaft 204 and coupling 511. In a second example, input shaft 152 transfers power to N-port differential 402 by way of second input shaft 156, and power into N-port differential 402 is divided between output shaft 510 by way of third output shaft 204 and coupler 154 by way of differential engine 102. Coupling 154 transfers to second input shaft 156 the combined power of input shaft 152 and differential engine 102.

In two additional examples, input on/off coupler 502 is off and output on/off coupler 506 is on. In the third example, all power from input shaft 152 is directed to N-port differential 402, and power from third output shaft 204 is split between output shaft 510 and N-port differential 402 by way of on/off output coupler 506 and differential engine 102. In the fourth example, all power from input shaft 152 is directed to N-port differential 402, and power from N-port differential 402 is split between third output shaft 204 and differential engine 102. Power from third output shaft 204 and differential engine 102 is combined by coupler 511 and output at output shaft 510.

FIG. 8 shows a block diagram of an N-port differential engine controlled transmission apparatus 600 in accordance with another embodiment. Elements of apparatus 600 that are identified with the same reference numeral as elements described above are analogous to those elements. Transmission apparatus 600, as shown, is similar to apparatus 500 including an N-port differential 402 having N ports (e.g. 3 or more ports).

In the example shown, shafts 152 and 510 can alternately be input or output shafts. Shaft 152 is shown coupled to first input shaft 104 to differential engine 102, by way of an input coupler 602 and optionally a torque converter 504. Similarly, shaft 510 is shown coupled to first input shaft 104 to differential engine 102, by way of an output coupler 604 and optionally a torque converter 508.

In at least one embodiment, input and output couplers 602 and 604 have two or more modes of operation. In a first mode, power input to the coupler is transferred to an output of the coupler. In a second mode, the coupler can lock to prevent rotation of one or both of the input and outputs to the coupler. In a third mode, the coupler can permit one or both of the inputs and outputs to the coupler to spin freely ("free-wheel") without transferring power between the input and output. In a fourth mode, the speed of one or both of the input and output of the coupler can be controlled, e.g. to synchronize the speed to another element of the apparatus 600 or related system as required. Couplers 602 and 604 may also have additional modes of operation. As shown, input coupler 602 includes a control signal input 606, and output coupler 604 includes a coupler control input 608. In at least one embodiment, an electrical, mechanical or hydraulic signal can be sent to a control signal input 606 or 608 to select a mode of operation for the corresponding input coupler 602 or output coupler 604.

When shaft 152 is an input shaft and shaft 510 is an output shaft, apparatus 600 may operate analogously to any of the four examples described above in reference to FIG. 7. In one exemplary application of the first of the four examples, shaft 152 may be connected to a rotary input source, such as a gasoline engine, and shaft 510 may be connected to one or more wheels of a vehicle (e.g. a truck). When the vehicle is climbing a hill or accelerating, the rotary input source transfers power to shaft 152, and power is transferred to shaft 510 to drive the wheels. In this case, input coupler 602 may transfer power from input shaft 152 to differential engine 102, output coupler 604 may prevent transfer of power between shaft 204 and torque converter 508, and all of the power exiting N-port differential 402 may be output through third output shaft 204 to the wheels.

In another case, the vehicle in this example is decelerating (e.g. braking), such that the wheels now provide an input of power to shaft 510, and power is withdrawn at shaft 152. In this case, apparatus 600 may operate according any one of at least the four following examples. The operation of apparatus 600 is not limited to operating according to the following examples in this or any other case.

In the first example, output coupler 604 may transfer power from shaft 510 to differential engine 102, input coupler 602 may prevent transfer of power between shaft 152 and torque converter 504, and all of the power exiting N-port differential 402 at shaft 156 is output through shaft 152 to, e.g., a generator or other power regenerative device.

In the second example, power from N-port differential may be split between differential engine 102 and shaft 152 by way of shaft 156. In this case, power from differential engine 102 may be directed back into N-port differential 402 by way of output coupler 604, and input coupler 602 may prevent transfer of power into coupler 154 through torque converter 504.

In a third example, power input at shaft 510 is transferred to N-port differential 402, which splits that power between shaft 156 and differential engine 102. The power of differential engine 102 (by way of input coupler 602) is combined with the power of shaft 156 at coupler 154 and output to shaft 152. In this case, output coupler 604 may transfer of power into torque converter 508.

In a fourth example, power input at shaft 510 is transferred to N-port differential 402. Power from N-port differential 402 is output to shaft 156. Coupler 154 splits the power of shaft 156 between shaft 152 and differential engine 102. Differential engine 102 outputs power back into N-port differential 402. In this case, output coupler 604 may prevent transfer of power into torque converter 508.

FIG. 9 shows a block diagram of an N+M-port differential engine controlled transmission apparatus 700 in accordance with another embodiment. Elements of apparatus 700 that are identified with the same reference numeral as elements described above are analogous to those elements. Transmission apparatus 700, as shown, is similar to apparatus 600, except that N-port differential 402 is replaced with an N+M port (e.g. 3 or more ports) differential 700.

In the example shown, N+M port differential 702 includes an additional M ports which can provide an output to a load (e.g. wheels of a vehicle), or an input or output coupled to a rotary power source (e.g. an electric or gasoline motor or other rotating shaft of apparatus 700 or external to apparatus 700). Optionally, one or more ports of N+M port differential 702 can be selectively locked (i.e. prevented from rotating), disconnected ("free-wheel", i.e. freely rotate without transmitting power) or coupled to a shaft that is capable of varying speeds and directions of freewheeling or provide braking torque.

FIG. 10 shows a block diagram of an N+M-port differential engine controlled transmission apparatus 800 in accordance with another embodiment. Elements of apparatus 800 that are identified with the same reference numeral as elements described above are analogous to those elements.

In the example shown, apparatus 800 includes a shaft 802 and a shaft 804, each coupled to N+M port differential 702. In one example, each of shafts 802 and 804 can alternatively be an input shaft or an output shaft. In at least one embodiment, when shaft 802 is an input shaft, then shaft 804 is an output shaft and vice versa. Optionally, shafts 802 and 804 can both be input or output shafts at the same time.

N+M port differential 702, as shown, may be at least partially controlled by rotational power transferred to one of shafts 156 and 204, and transferred from the other of shafts 156 and 204. As discussed above, each of shafts 156 and 204 can alternatively be an input shaft or an output shaft. Any other two shafts of N+M port differential make take on the roles of shafts 156 and 204.

FIG. 11 shows a block diagram of a differential engine controlled transmission apparatus 900 in accordance with another embodiment. As shown, apparatus 900 provides a generalized illustration of the flow of energy into and out of apparatus consistent with at least some embodiments. As shown, apparatus 900 includes a multi-port differential apparatus 902. In one example apparatus 902 is one of systems 600, 700, and 800. Apparatus 902 is shown including an input 904 and an output 906. In at least one embodiment, input 904 and output 906 can alternate between being an input that receives an input of power, and being an output that delivers an output of power.

FIG. 12 shows a block diagram illustrating a system 1000 including a networked plurality of differential engine controlled transmission apparatus 1002. In one example, each transmission apparatus 1002 is one of systems 100, 150, 200, 400, 500, 600, 700, or 800 described above. In at least one embodiment, each transmission apparatus 1002 can communicate with one or more of the other transmission apparatus in the network using network signals 42 (see FIG. 2A) communicated between differential engines 102 of those transmission apparatus 1002.

Optionally, system 1000 can include transmission apparatus 1002 of any size and number to accommodate any one of a variety of applications. For example, large machinery, such as aircrafts, large marine crafts and large industrial machinery may include a system 1000 including a plurality of large transmission apparatus 1002 capable of handling high power inputs and outputs.

In another example, one transmission apparatus 1002 or a system 1000 including a plurality of transmission apparatus 1002 can be provided in sub-molecular or nano-technology sizes. A system 1000 of tiny transmission apparatus 1002 may be created as a programmable sheet of material or into a programmable shape that could create any surface structure in fixed form or as a dynamically changing form. Such a sheet could be formed to act as a barrier (e.g. a cover) to absorb, expend or transfer energy. A network controllable dynamic surface with internal and/or external rotational forces and an internal and/or external flow of electrical power could have unlimited uses, such as for a programmable building or a programmable vehicle.

In at least one embodiment, the number of transmission apparatus 1002 in a system 1000 can be selected to provide redundancy for an application (e.g. a helicopter or spacecraft). This may permit the repair or replacement of a transmission apparatus 1002 in the system 1000 without disrupting the operation of the application.

In at least one embodiment, two or more transmission apparatus 1002 of a system 1000 may be interconnected to handle greater power inputs and loads than any one of the transmission apparatus 1002 could handle individually.

Reference is now made to FIGS. 13 and 14. FIG. 13 shows a block diagram of a 2-wheel powertrain 1100 utilizing two transmission apparatus made in accordance with at least one embodiment. FIG. 14 shows a block diagram of a 4-wheel powertrain 1200 utilizing four transmission apparatus made in accordance with at least one embodiment. Elements of powertrains 1100 and 1200 that are identified with the same reference numeral as elements described above are analogous to those elements. Powertrains 1100 and 1200 are shown including a plurality of transmission apparatus 1002 all receiving power input from a common primary engine 1102. Engine 1102 may be, for example, a common vehicle engine such as a gasoline, propane, diesel, or electric powered engine or a hybrid engine powered by multiple energy sources.

In the examples shown, each transmission apparatus 1002 is coupled to a different wheel 1104. In operation, power is transferred between engine 1102 and the multiport differential of each transmission apparatus 1002. In one example, a transmission shaft 1106 transfers power between engine 1102 and input shafts 1108 of transmission apparatus 1002.

In at least some embodiments, transmission apparatus 1002 are coordinated (e.g. for accelerating, braking and turning) using network signals transmitted to and between transmission apparatus 1002. In one example, transmission apparatus 1002 can receive network signals instructing the differential engine system to achieve a particular output speed and/or torque. In at least one embodiment, powertrains 1100 and 1200 can coordinate the rotation of wheels 1104 using transmission apparatus 1002 to provide the function of a conventional transmission and individual wheel traction control. Optionally, transmission apparatus 1002 are mechanically coordinated (e.g. using a conventional differential and transmission shaft).

FIG. 15 shows a block diagram of a differential engine controlled transmission apparatus 1300 in accordance with another embodiment. Elements of apparatus 1300 that are identified with the same reference numeral as elements described above are analogous to those elements. Transmission apparatus 1300, as shown, is similar to apparatus 150, except that except that between differential engine 102 and 3-port differential 160 there is only one torque converter 112 instead of two torque converters in parallel with corresponding one-way bearings. Accordingly, the description of apparatus 150 above applies mutatis mutandis to apparatus 1300.

In the example shown, power from input shaft 152 is split by coupler 154 between first and second input shafts 104 and 156. First input shaft 104 provides an input to differential engine 102 which drives first output shaft 106. As shown, 3-port differential 160 receives power input from second input shaft 156 and first output shaft 106, and transmits power to third output shaft 158.

The operation of FIG. 15 will be described with reference to four non-limiting examples. In a first example, first output shaft 106 is free-wheeling. Power from input shaft 152 is coupled through second input shaft 156 to three-port differential 160 and then to rotating the free-wheeling first output shaft 106. No power is output to third output shaft 158 in this example.

In a second example, differential engine 102 applies some load to slow the rotation of first output shaft 106. In this example, the power entering the 3-port differential 160 by second input shaft 156 is split between the rotationally loaded port at first output shaft 106 and third output shaft 158. Coupling 154 drives second input shaft 156 with the combined power of input 152 and first input shaft 104.

In a third example, differential engine 102 stops the rotation of first input shaft 104 and first output shaft 106. In this example, all of the power from input shaft 152 is transferred to output shaft 158, which rotates at a baseline speed.

In a fourth example, differential engine 102 applies energy to first output shaft 106 to rotate first output shaft 106 opposite to the free-wheeling direction illustrated in the first and second examples. In this example, 3-port differential receives power input from second input shaft 156 and first output shaft 106 and outputs power to third output shaft 158 which rotates faster than the baseline speed (i.e. at an "overdrive" speed).

These examples illustrates that in some embodiments, apparatus 1300 may provide an expanded range of available speed conversion ratios including overdrive speed conversion ratios which exceed the baseline speed conversion ratio between second input shaft 156 and third output shaft 158 across 3-port differential 160.

As shown in FIG. 16, some embodiments of apparatus 1300 may include one or more static or variable torque converters 112, e.g. interposed between differential engine 102 and 3-port differential 160.

Further, as shown in FIG. 17, some embodiments of apparatus 1300 may include an N-port differential 402 instead of a 3-port differential, and a corresponding plurality of couplers 404 forming a multiplicity of pathways for power to be transferred between differential engine 102 and N-port differential 402. Also, apparatus 1300 may operate in reverse such that shaft 152 is an output shaft and shaft 158 is an input shaft.

FIG. 18 shows another embodiment of apparatus 1300 that is similar to apparatus 600 in FIG. 8. As shown, shaft 152 is coupled to first input shaft 104 to differential engine 102, by way of an input coupler 602 and optionally a torque converter 504. Similarly, shaft 510 is shown coupled to first input shaft 104 to differential engine 102, by way of output coupler 604 and optionally a torque converter 508.

In the example shown, the operation of apparatus 1300 is analogous to the operation of apparatus 600, except that between differential engine 102 and N-port differential 402 there is only one torque converter 112 instead of two torque converters in parallel with corresponding one-way bearings. There may also be fewer couplings 404 required. Accordingly, the description with respect to apparatus 600 above applies mutatis mutandis to the apparatus 1300 shown in FIG. 18.

FIG. 19 shows another embodiment of apparatus 1300 that is similar to apparatus 800 in FIG. 10. As shown, apparatus 1300 includes a shaft 802 and a shaft 804, each coupled to an N+M port differential 702. In one example, each of shafts 802 and 804 can alternatively be an input shaft or an output shaft. In at least one embodiment, when shaft 802 is an input shaft, then shaft 804 is an output shaft and vice versa. Optionally, shafts 802 and 804 can both be input or output shafts at the same time.

In the example shown, the operation of apparatus 1300 is analogous to the operation of apparatus 800, except that between differential engine 102 and N+M port differential 702 there is only one torque converter 112 instead of two torque converters in parallel with corresponding one-way bearings. There may also be fewer couplings 404 required. Accordingly, the description with respect to apparatus 800 above applies mutatis mutandis to the apparatus 1300 shown in FIG. 19.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A rotational power transmission apparatus, comprising:
   a. a first shaft coupled to a second shaft and a third shaft,
   b. a fourth shaft;
   c. a fifth shaft;
   d. a multiport differential;
   e. said third shaft coupled to one port of said multiport differential so that said third shaft is between said first shaft and said multiport differential,
   f. said fourth shaft and said fifth shaft coupled to respective ports of said multiport differential;
   g. a differential engine coupled to the multiport differential so that said fourth shaft is between said differential engine and said multiport differential, and the second shaft is between the first shaft and the differential engine, the differential engine applying a variable speed conversion ratio between its input and its output, the differential engine being controllable to set the variable speed conversion ratio to a speed conversion ratio within a range of speed conversion ratios, and wherein input and output of said differential engine are bi-directional.

2. A rotational power transmission apparatus according to claim 1, wherein the range includes negative and positive speed conversion ratios.

3. A rotational power transmission apparatus according to claim 1, further comprising a torque converter coupled between the differential engine and the multiport differential, said torque converter applies a torque conversion ratio between the second shaft and the fourth shaft.

4. A rotational power transmission apparatus according to claim 3, wherein the torque conversion ratio of the torque converter is 1:1.

5. A rotational power transmission apparatus according to claim 3, wherein the torque converter is a shaft.

6. A rotational power transmission apparatus according to claim 1, wherein the multiport differential is a 3-port differential.

7. A rotational power transmission apparatus according to claim 1, wherein when the first shaft inputs power the fifth shaft outputs power, and when the fifth shaft inputs power the first shaft outputs power.

8. A rotational power transmission apparatus according to claim 1, further comprising:
   a. said fourth shaft coupled to said torque converter;
   b. the torque converter coupled to a sixth shaft that is connected to the multiport differential;

c. the torque converter coupled to a seventh shaft that is connected to the multiport differential.

9. A rotational power transmission apparatus according to claim 1, wherein power is transmitted between said fifth shaft and said differential engine without said multiport differential therebetween.

10. A method of providing a rotational power transmission apparatus, said method comprising the steps of:
   a. providing an input shaft which is coupled to a first shaft which receives a first power portion and a second shaft which receives a second power portion;
   b. providing an multiport differential which receives the first power portion from the first shaft;
   c. providing a differential engine which receives the second power portion from the second shaft, which provides a variable speed conversion ratio to the second power portion, and which outputs converted power which is received by the multiport differential.

11. A method of providing a rotational power transmission apparatus according to claim 10, further comprising the step of providing a variable torque converter which applies a torque conversion ratio of 1:1 or greater to the converted power output by the differential engine before the converted power is received by the multiport differential.

12. A method of providing a rotational power transmission apparatus according to claim 10, wherein input and output of said differential engine are bi-directional.

13. A method of providing a rotational power transmission apparatus according to claim 10, wherein an output shaft of said rotational power transmission apparatus outputs power from said multiport differential.

14. A method of providing a rotational power transmission apparatus according to claim 10, wherein power is output from said input shaft, power is input to said output shaft, and said power input to said output shaft is transferred to said differential engine without said multiport differential therebetween.

* * * * *